United States Patent
Hayes et al.

(10) Patent No.: US 12,516,092 B2
(45) Date of Patent: Jan. 6, 2026

(54) PEPTIDE LIGANDS OF THE GDNF FAMILY RECEPTOR A-LIKE (GFRAL) RECEPTOR

(71) Applicants: THE TRUSTEES OF THE UNIVERSITY OF PENNSYLVANIA, Philadelphia, PA (US); SYRACUSE UNIVERSITY, Syracuse, NY (US)

(72) Inventors: Matthew Robert Hayes, Lansdale, PA (US); Bart C. De Jonghe, Philadelphia, PA (US); Tito Borner, Philadelphia, PA (US); Robert Doyle, Manlius, NY (US); Ian Tinsley, Syracuse, NY (US)

(73) Assignees: The Trustees of the University of Pennsylvania, Philadelphia, PA (US); Syracuse University, Syracuse, NY (US)

( * ) Notice: Subject to any disclaimer, the term of this patent is extended or adjusted under 35 U.S.C. 154(b) by 1120 days.

(21) Appl. No.: 17/427,751

(22) PCT Filed: Feb. 5, 2020

(86) PCT No.: PCT/US2020/016844
§ 371 (c)(1),
(2) Date: Aug. 2, 2021

(87) PCT Pub. No.: WO2020/163502
PCT Pub. Date: Aug. 13, 2020

(65) Prior Publication Data
US 2022/0127316 A1     Apr. 28, 2022

Related U.S. Application Data

(60) Provisional application No. 62/801,391, filed on Feb. 5, 2019.

(51) Int. Cl.
| | | |
|---|---|---|
| C07K 14/475 | (2006.01) |
| A61K 47/55 | (2017.01) |
| A61K 47/64 | (2017.01) |
| A61K 49/00 | (2006.01) |
| A61P 1/08 | (2006.01) |
| A61P 3/00 | (2006.01) |
| A61P 3/04 | (2006.01) |
| A61P 15/00 | (2006.01) |

(52) U.S. Cl.
CPC .......... *C07K 14/475* (2013.01); *A61K 47/551* (2017.08); *A61K 47/642* (2017.08); *A61K 49/0056* (2013.01); *A61P 1/08* (2018.01); *A61P 3/00* (2018.01); *A61P 3/04* (2018.01); *A61P 15/00* (2018.01)

(58) Field of Classification Search
None
See application file for complete search history.

(56) References Cited

U.S. PATENT DOCUMENTS

| 7,378,089 B2 | 5/2008 | Fathman |
| 2013/0115212 A1 | 5/2013 | Nykjaer et al. |
| 2018/0100003 A1 | 4/2018 | Matern et al. |

FOREIGN PATENT DOCUMENTS

| WO | 9325673 A1 | 12/1993 |
| WO | 0147946 A2 | 7/2001 |
| WO | 2017172260 A1 | 10/2017 |

OTHER PUBLICATIONS

Mullican et al., Nat. Med. 23:1150-1157 (2017) (Year: 2017).*
International Search Report and Written Opinion, PCT/US2020/016844, dated Jun. 26, 2020.
UniProt Submission A0A1A7XEK4_9 TELE, Glial Cell derived neurotrophic factor a, [Online], Oct. 5, 2016, [retrieved on May 13, 2020]. Retrieved from: https://www.uniprot.org/uniprot/A0A1A7XEK4.
Altschul, et al., "Basic local alignment search tool", J. Mol. Biol., Oct. 5, 1990, 215(3), 403-410 (Abstract only).
Altschul, et al., "Gapped BLAST and PSI-BLAST: a new generation of protein database search programs", Nuc. Acids Res., Sep. 1, 1997, 25(17), 3389-3402.
Anderson, et al., "Human gene therapy", Science, 256(5058):808-813 (May 8, 1992) (Abstract only).
Bainbridge, et al., "Effect of gene therapy on visual function in Leber's congenital Amaurosis", N Engl Med, May 22, 2008, 358:2231-2239.
Baumgartner, et al., "Constitutive expression of phVEGF165 after intramuscular gene transfer promotes collateral vessel development in patients with critical limb ischemia", Circulation, Mar. 31, 1998, 97(12): 1114-1123.
Henikoff, et al., "Amino acid substitution matrices from protein blocks", Proc. Natl. Acad. Sci. USA, Nov. 15, 1992, 89(22), 10915-10919.
Jones, et al., "Replacing the complementarity-determining regions in a human antibody with those from a mouse", Nature, 321(6069): 522-525, May 29-Jun. 4, 1986 (Abstract only).
Karlin, et al., "Applications and statistics for multiple high-scoring segments in molecular sequences", Proc. Natl. Acad. Sci. USA, Jun. 1993, 90, 5873-5877.
Maguire, et al., "Safety and efficacy of gene transfer for Leber's congenital Amaurosis", N Engl J Med, May 22, 2008, 358(21): 2240-8.
Presta, et al., "Antobody Engineering", Current Opinion in Structural Biology, vol. 2, Issue 4, Aug. 1992, pp. 593-596 (Abstract only).
Reichmann, et al., "Reshaping human antibodies for therapy", Nature, 332: 323-329, 1988.

(Continued)

*Primary Examiner* — Thea D' Ambrosio
(74) *Attorney, Agent, or Firm* — Saul Ewing LLP; Kathryn Doyle; Justin Crotty

(57) ABSTRACT

The present invention relates to engineered peptides and to methods of making engineered peptides. The present invention also relates to methods of treatment comprising administration of the engineered peptides to a subject in need thereof.

13 Claims, 13 Drawing Sheets

Specification includes a Sequence Listing.

(56) References Cited

OTHER PUBLICATIONS

Seroogy, et al., "A gene therapy approach to treatment of autoimmune diseases", Immunol Res. Aug. 1998;18(1):15-26. doi: 10.1007/BF02786510. PMID: 9724846. (Abstract only).
Strejan, et al., "Suppression of chronic-relapsing experimental allergic encephalomyelitis in strain-13 guinea pigs by administration of liposome-associated myelin basic protein", J. Neuroimmunol. Jan. 1, 1984, 7:27-41 (Abstract only).
Urquhart, et al., "Rate-controlled delivery systems in drug and hormone research", Ann. Rev. Pharmacol. Toxicol., 1984, 24:199 (Abstract only).
European Search Report, EP Application No. 20752864.7, dated Jan. 25, 2023, 7 pages.

* cited by examiner

GFANT05

Thr-Lys-Glu-Glu-Leu-Ile-His-Ala-His-Ala-Asp-Pro-Met-Val-Leu-Ile-Gln-Lys-Thr-Asp-Thr-Gly-Val-Ser-Leu-Gln-Thr-Tyr-Asp

PEPTIDE LIGANDS OF THE GDNF FAMILY RECEPTOR A-LIKE (GFRAL) RECEPTOR

CROSS-REFERENCE TO RELATED APPLICATIONS

The present application is a 35 U.S.C. § 371 national phase application from, and claims priority to, International Application No. PCT/US2020/016844, filed Feb. 5, 2020, and published under PCT Article 21(2) in English, which is entitled to priority under 35 U.S.C. § 119(e) to U.S. Provisional Patent Application No. 62/801,391, filed Feb. 5, 2019, which are hereby incorporated by reference in their entireties herein.

BACKGROUND OF THE INVENTION

Long-term weight management and regulation of normal ingestive behavior in patients suffering from chronic diseases are serious problems without sufficient therapeutic treatments. Cachexia, nausea and chronic emesis from chemotherapy, cancer, chronic diseases and morning sickness are all difficult to manage and can be extremely debilitating and can compromise an individual's quality-of-life. Nausea and emesis can also set the upper tolerable dose of a therapeutic due to patient intolerance, thus potentially limiting drug efficacy. Accordingly, there is a need for an approach that can modulate the anorectic/nausea/emesis response to cancer, metabolic diseases and therapeutic treatments of various diseases. There is also a need for treatments for diseases or conditions that result in unhealthy increases or decreases in body weight, including but not limited to obesity and anorexia nervosa. As energy balance regulation also includes autonomic control of sympathetic and parasympathetic neural functions that affect various physiological responses, it is conceivable that systems regulating the aversive aspects of illness behavior can also be targeted in contrast to influence motivated and maladaptive motivated behaviors, such as substance abuse. To this end, given the need for treatments for sexual dysfunction there is a possibility to target a biological system that can also influence sexual behaviors and actions.

The present invention addresses the aforementioned unmet needs.

SUMMARY OF THE INVENTION

In one aspect, the invention provides an engineered peptide comprising any one of the amino acid sequences of SEQ ID NOs: 1-10.

In another aspect, the invention provides a polynucleotide encoding the engineered peptide of the invention.

In yet another aspect the invention provides a pharmaceutical composition comprising the engineered peptide of the invention.

In yet another aspect, the invention provides a method of treating a disease or a condition in a subject in need thereof, comprising the step of administering the engineered peptide of the invention to the subject.

In yet another aspect, the invention provides a method of promoting weight gain in a subject in need thereof by administering the engineered peptide of the invention to the subject.

In yet another aspect, the invention provides a method of promoting weight loss in a subject in need thereof by administering the engineered peptide of the invention to the subject.

In certain embodiments, at least one of the amino acids of the peptide is a modified amino acid.

In certain embodiments, the engineered peptide is an antagonist of a GDNF family receptor alpha-like (GFRAL) receptor.

In certain embodiments; the amino acid sequence of the engineered peptide comprises SEQ ID NO: 5.

In certain embodiments, the engineered peptide is an agonist of a GFRAL receptor.

In certain embodiments, the amino acid sequence of the engineered peptide comprises SEQ ID NO: 1.

In certain embodiments, the engineered peptide is linked to a vitamin B12 compound, a lipid or a fluorophore. In certain embodiments, the vitamin B12 compound, the lipid, or the fluorophore is linked to the peptide directly or via a linker. In certain embodiments, the vitamin B12 compound, the lipid, or the fluorophore is directly linked to any amino acid of the peptide. In certain embodiments, the vitamin B12 compound, the lipid or the fluorophore is directly linked to any modified amino acid of the peptide. In certain embodiments, the engineered peptide further comprises a metal ion bound to the peptide.

In certain embodiments, the metal ion is a $Zn^{2+}$ ion or a $Ca^{2+}$ ion.

In certain embodiments, the disease or the condition is nausea, emesis, cachexia, unintentional weight loss, loss of appetite, pica, anorexia or illness-like behaviors.

In certain embodiments, the disease or the condition is obesity or body weight regulation.

In certain embodiments, the disease or the condition is sexual dysfunction.

In certain embodiments, the engineered peptide is administered in a dosage of 1 pmole/kg to 100 mmoles/kg.

In certain embodiments, the engineered peptide is administered acutely or chronically over the course of multiple hours or days.

BRIEF DESCRIPTION OF THE DRAWINGS

The following detailed description of selected embodiments of the invention will be better understood when read in conjunction with the appended drawings. For the purpose of illustrating the invention, selected embodiments are shown in the drawings. It should be understood, however, that the invention is not limited to the precise arrangements and instrumentalities of the embodiments shown in the drawings.

DETAILED DESCRIPTION

Definitions

Figure 1:
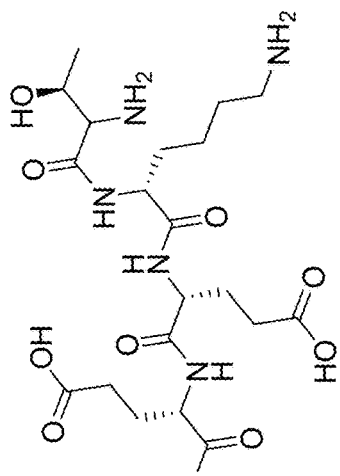
FIG. 1 illustrates the peptide GFANT05. The sequence shown is that of GFANT05, wherein the GFANT05 peptide of SEQ ID NO: 5 has a wild-type lysine (K) in position K2.
Figure 1:
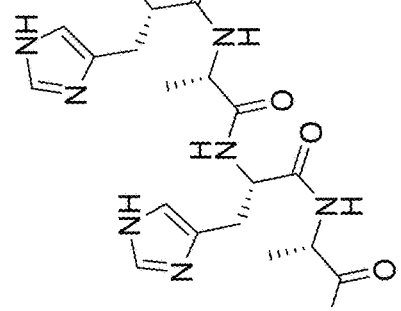
Figure 1:
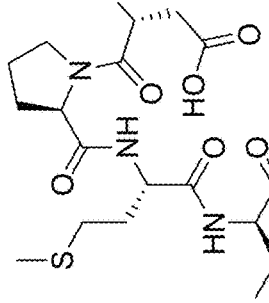
Figure 1:
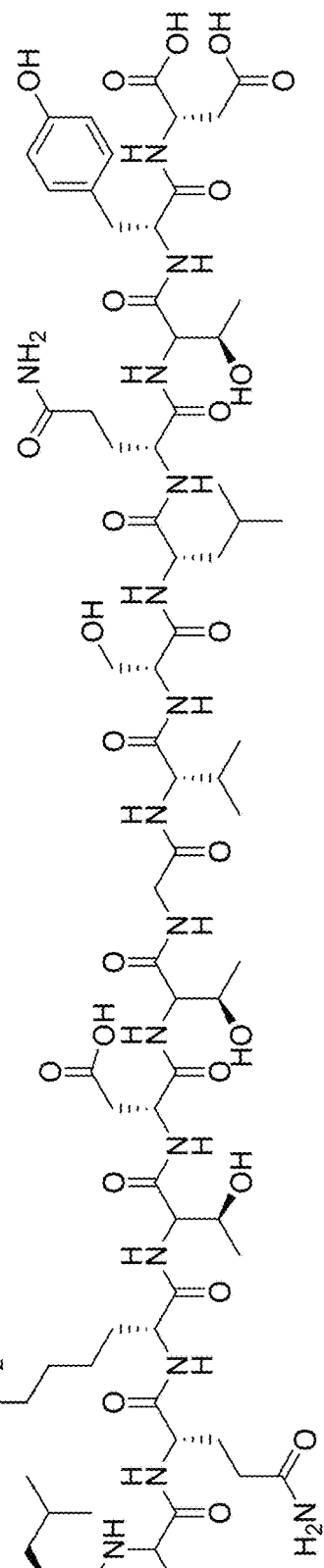

Unless defined otherwise, all technical and scientific terms used herein have the same meaning as commonly understood by one of ordinary skill in the art to which the invention pertains. Although any methods and materials similar or equivalent to those described herein can be used in the practice for testing of the present invention, the preferred materials and methods are described herein. In describing and claiming the present invention, the following terminology will be used.

It is also to be understood that the terminology used herein is for the purpose of describing particular embodiments only and is not intended to be limiting.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods. As used herein, the term "conservative sequence modifications" is intended to refer to amino acid modifications that do not significantly affect or alter the binding characteristics of the peptide containing the amino acid sequence. Such conservative modifications include amino acid substitutions, additions and deletions and use of similar structured non-canonical amino acids or D-isomers of any of the canonical amino acids and/or non-canonical amino acids. Modifications can be introduced into a peptide of the invention by standard techniques known in the art, such as solid-phase peptide synthesis, site-directed mutagenesis and PCR-mediated mutagenesis. Conservative amino acid substitutions are ones in which the amino acid residue is replaced with an amino acid residue having a similar side chain. Families of amino acid residues having similar side chains have been defined in the art. These families include amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine, tryptophan), nonpolar side chains (e.g., alanine, valine, leucine, isoleucine, proline, phenylalanine, methionine), beta-branched side chains (e.g., threonine, valine, isoleucine) and aromatic side chains (e.g., tyrosine, phenylalanine, tryptophan, histidine). Non-canonical examples include azido-lysine, methyl-alanine.

A "disease" is a state of health of a subject wherein the subject cannot maintain homeostasis, and wherein if the disease is not ameliorated then the subject's health continues to deteriorate. In contrast, a "disorder" in a subject is a state of health in which the subject is able to maintain homeostasis, but in which the subject's state of health is less favorable than it would be in the absence of the disorder. Left untreated, a disorder does not necessarily cause a further decrease in the subject's state of health.

"Effective amount" or "therapeutically effective amount" are used interchangeably herein, and refer to an amount of a compound, formulation, material, or composition, as described herein effective to achieve a particular biological result or provides a therapeutic or prophylactic benefit. Such results may include, but are not limited to, anti-tumor activity as determined by any means suitable in the art.

"Encoding" refers to the inherent property of specific sequences of nucleotides in a polynucleotide, such as a gene, a cDNA, or an mRNA, to serve as templates for synthesis of other polymers and macromolecules in biological processes having either a defined sequence of nucleotides (i.e., rRNA, tRNA and mRNA) or a defined sequence of amino acids and the biological properties resulting therefrom. Thus, a gene encodes a protein if transcription and translation of mRNA corresponding to that gene produces the protein in a cell or other biological system. Both the coding strand, the nucleotide sequence of which is identical to the mRNA sequence and is usually provided in sequence listings, and the non-coding strand, used as the template for transcription of a gene or cDNA, can be referred to as encoding the protein or other product of that gene or cDNA.

As used herein "endogenous" refers to any material from or produced inside an organism, cell, tissue or system.

As used herein, the term "exogenous" refers to any material introduced from or produced outside an organism, cell, tissue or system.

The term "expression" as used herein is defined as the transcription and/or translation of a particular nucleotide sequence driven by its promoter.

"Expression vector" refers to a vector comprising a recombinant polynucleotide comprising expression control sequences operatively linked to a nucleotide sequence to be expressed. An expression vector comprises sufficient cis-acting elements for expression; other elements for expression can be supplied by the host cell or in an in vitro expression system. Expression vectors include all those known in the art, such as cosmids, plasmids (e.g., naked or contained in liposomes) and viruses (e.g., sendai viruses, lentiviruses, retroviruses, adenoviruses, and adeno-associated viruses) that incorporate the recombinant polynucleotide.

"Homologous" as used herein, refers to the subunit sequence identity between two polymeric molecules, e.g., between two nucleic acid molecules, such as, two DNA molecules or two RNA molecules, or between two polypeptide molecules. When a subunit position in both of the two molecules is occupied by the same monomeric subunit; e.g., if a position in each of two DNA molecules is occupied by adenine, then they are homologous at that position. The homology between two sequences is a direct function of the number of matching or homologous positions; e.g., if half (e.g., five positions in a polymer ten subunits in length) of the positions in two sequences are homologous, the two sequences are 50% homologous; if 90% of the positions (e.g., 9 of 10), are matched or homologous, the two sequences are 90% homologous.

"Humanized" forms of non-human (e.g., murine) antibodies are chimeric immunoglobulins, immunoglobulin chains or fragments thereof (such as Fv, Fab, Fab', F(ab')2 or other antigen-binding subsequences of antibodies) which contain minimal sequence derived from non-human immunoglobulin. For the most part, humanized antibodies are human immunoglobulins (recipient antibody) in which residues from a complementary-determining region (CDR) of the recipient are replaced by residues from a CDR of a non-human species (donor antibody) such as mouse, rat or rabbit having the desired specificity, affinity, and capacity. In some instances, Fv framework region (FR) residues of the human immunoglobulin are replaced by corresponding non-human residues. Furthermore, humanized antibodies can comprise residues which are found neither in the recipient antibody nor in the imported CDR or framework sequences. These modifications are made to further refine and optimize antibody performance. In general, the humanized antibody will comprise substantially all of at least one, and typically two, variable domains, in which all or substantially all of the CDR regions correspond to those of a non-human immunoglobulin and all or substantially all of the FR regions are those of a human immunoglobulin sequence. The humanized antibody optimally also will comprise at least a portion of an immunoglobulin constant region (Fc), typically that of a human immunoglobulin. For further details, see Jones et al., Nature, 321: 522-525, 1986; Reichmann et al., Nature, 332: 323-329, 1988; Presta, Curr. Op. Struct. Biol., 2: 593-596, 1992.

"Fully human" refers to an immunoglobulin, such as an antibody, where the whole molecule is of human origin or consists of an amino acid sequence identical to a human form of the antibody.

"Identity" as used herein refers to the subunit sequence identity between two polymeric molecules particularly between two amino acid molecules, such as, between two polypeptide molecules. When two amino acid sequences have the same residues at the same positions; e.g., if a position in each of two polypeptide molecules is occupied by an Arginine, then they are identical at that position. The identity or extent to which two amino acid sequences have the same residues at the same positions in an alignment is often expressed as a percentage. The identity between two amino acid sequences is a direct function of the number of matching or identical positions; e.g., if half (e.g., five positions in a polymer ten amino acids in length) of the positions in two sequences are identical, the two sequences are 50% identical; if 90% of the positions (e.g., 9 of 10), are matched or identical, the two amino acids sequences are 90% identical.

The term "immune response" as used herein is defined as a cellular response to an antigen that occurs when lymphocytes identify antigenic molecules as foreign and induce the formation of antibodies and/or activate lymphocytes to remove the antigen.

As used herein, an "instructional material" includes a publication, a recording, a diagram, or any other medium of expression which can be used to communicate the usefulness of the compositions and methods of the invention. The instructional material of the kit of the invention may, for example, be affixed to a container which contains the nucleic acid, peptide, and/or composition of the invention or be shipped together with a container which contains the nucleic acid, peptide, and/or composition. Alternatively, the instructional material may be shipped separately from the container with the intention that the instructional material and the compound be used cooperatively by the recipient.

"Isolated" means altered or removed from the natural state. For example, a nucleic acid or a peptide naturally present in a living animal is not "isolated," but the same nucleic acid or peptide partially or completely separated from the coexisting materials of its natural state is "isolated." An isolated nucleic acid or protein can exist in substantially purified form, or can exist in a non-native environment such as, for example, a host cell.

A "lentivirus" as used herein refers to a genus of the Retroviridae family. Lentiviruses are unique among the retroviruses in being able to infect non-dividing cells; they can deliver a significant amount of genetic information into the DNA of the host cell, so they are one of the most efficient methods of a gene delivery vector. HIV, RV, and FIV are all examples of lentiviruses. Vectors derived from lentiviruses offer the means to achieve significant levels of gene transfer in vivo.

By the term "modified" as used herein, is meant a changed state or structure of a molecule or cell of the invention. Molecules may be modified in many ways, including chemically, structurally, and functionally. Cells may be modified through the introduction of nucleic acids.

By the term "modulating," as used herein, is meant mediating a detectable increase or decrease in the level of a response in a subject compared with the level of a response in the subject in the absence of a treatment or compound, and/or compared with the level of a response in an otherwise identical but untreated subject. The term encompasses perturbing and/or affecting a native signal or response thereby mediating a beneficial therapeutic response in a subject, preferably, a human.

In the context of the present invention, the following abbreviations for the commonly occurring nucleic acid bases are used. "A" refers to adenosine, "C" refers to cytosine, "G" refers to guanosine, "T" refers to thymidine, and "U" refers to uridine.

Unless otherwise specified, a "nucleotide sequence encoding an amino acid sequence" includes all nucleotide sequences that are degenerate versions of each other and that encode the same amino acid sequence. The phrase nucleotide sequence that encodes a protein or an RNA may also include introns to the extent that the nucleotide sequence encoding the protein may in some version contain an intron (s).

The term "operably linked" refers to functional linkage between a regulatory sequence and a heterologous nucleic acid sequence resulting in expression of the latter. For example, a first nucleic acid sequence is operably linked with a second nucleic acid sequence when the first nucleic acid sequence is placed in a functional relationship with the second nucleic acid sequence. For instance, a promoter is operably linked to a coding sequence if the promoter affects the transcription or expression of the coding sequence. Generally, operably linked DNA sequences are contiguous and, where necessary to join two protein coding regions, in the same reading frame.

The term "overexpressed" tumor antigen or "overexpression" of a tumor antigen is intended to indicate an abnormal level of expression of a tumor antigen in a cell from a disease area like a solid tumor within a specific tissue or organ of the patient relative to the level of expression in a normal cell from that tissue or organ. Patients having solid tumors or a hematological malignancy characterized by overexpression of the tumor antigen can be determined by standard assays known in the art.

"Parenteral" administration of an immunogenic composition includes, e.g., subcutaneous (s.c.), intravenous (i.v.), intramuscular (i.m.), or intrasternal injection, or infusion techniques.

The term "polynucleotide" as used herein is defined as a chain of nucleotides. Furthermore, nucleic acids are polymers of nucleotides. Thus, nucleic acids and polynucleotides as used herein are interchangeable. One skilled in the art has the general knowledge that nucleic acids are polynucleotides, which can be hydrolyzed into the monomeric "nucleotides." The monomeric nucleotides can be hydrolyzed into nucleosides. As used herein polynucleotides include, but are not limited to, all nucleic acid sequences which are obtained by any means available in the art, including, without limitation, recombinant means, i.e., the cloning of nucleic acid sequences from a recombinant library or a cell genome, using ordinary cloning technology and PCR™, and the like, and by synthetic means.

As used herein, the terms "peptide," "polypeptide," and "protein" are used interchangeably, and refer to a compound comprised of amino acid residues covalently linked by peptide bonds. A protein or peptide must contain at least two amino acids, and no limitation is placed on the maximum number of amino acids that can comprise a protein's or peptide's sequence. Polypeptides include any peptide or protein comprising two or more amino acids joined to each other by peptide bonds. As used herein, the term refers to both short chains, which also commonly are referred to in the art as peptides, oligopeptides and oligomers, for example, and to longer chains, which generally are referred to in the art as proteins, of which there are many types. "Polypeptides" include, for example, biologically active fragments, substantially homologous polypeptides, oligopeptides, homodimers, heterodimers, variants of polypeptides, modified polypeptides, derivatives, analogs, fusion proteins, among others. The polypeptides include natural peptides, recombinant peptides, synthetic peptides, or a combination thereof.

The term "promoter" as used herein is defined as a DNA sequence recognized by the synthetic machinery of the cell, or introduced synthetic machinery, required to initiate the specific transcription of a polynucleotide sequence.

As used herein, the term "promoter/regulatory sequence" means a nucleic acid sequence which is required for expression of a gene product operably linked to the promoter/regulatory sequence. In some instances, this sequence may be the core promoter sequence and in other instances, this sequence may also include an enhancer sequence and other regulatory elements which are required for expression of the gene product. The promoter/regulatory sequence may, for example, be one which expresses the gene product in a tissue specific manner.

A "constitutive" promoter is a nucleotide sequence which, when operably linked with a polynucleotide which encodes or specifies a gene product, causes the gene product to be produced in a cell under most or all physiological conditions of the cell.

An "inducible" promoter is a nucleotide sequence which, when operably linked with a polynucleotide which encodes or specifies a gene product, causes the gene product to be produced in a cell substantially only when an inducer which corresponds to the promoter is present in the cell.

A "tissue-specific" promoter is a nucleotide sequence which, when operably linked with a polynucleotide encodes or specified by a gene, causes the gene product to be produced in a cell substantially only if the cell is a cell of the tissue type corresponding to the promoter.

A "Sendai virus" refers to a genus of the Paramyxoviridae family. Sendai viruses are negative, single stranded RNA viruses that do not integrate into the host genome or alter the genetic information of the host cell. Sendai viruses have an exceptionally broad host range and are not pathogenic to humans. Used as a recombinant viral vector, Sendai viruses are capable of transient but strong gene expression.

A "signal transduction pathway" refers to the biochemical relationship between a variety of signal transduction molecules that play a role in the transmission of a signal from one portion of a cell to another portion of a cell. The phrase "cell surface receptor" includes molecules and complexes of molecules capable of receiving a signal and transmitting signal across the plasma membrane of a cell.

The term "subject" is intended to include living organisms in which an immune response can be elicited (e.g., mammals). A "subject" or "patient," as used therein, may be a human or non-human mammal. Non-human mammals include, for example, livestock and pets, such as ovine, bovine, porcine, canine, feline, and murine mammals. Preferably, the subject is human.

As used herein, "substantially purified" refers to being essentially free of other components. For example, a substantially purified polypeptide is a polypeptide which has been separated from other components with which it is normally associated in its naturally occurring state.

The term "therapeutic" as used herein means a treatment and/or prophylaxis. A therapeutic effect is obtained by suppression, remission, or eradication of a disease state.

The term "transfected" or "transformed" or "transduced" as used herein refers to a process by which exogenous nucleic acid is transferred or introduced into the host cell. A "transfected" or "transformed" or "transduced" cell is one which has been transfected, transformed or transduced with exogenous nucleic acid. The cell includes the primary subject cell and its progeny.

To "treat" a disease as the term is used herein, means to reduce the frequency or severity of at least one sign or symptom of a disease or disorder experienced by a subject.

The phrase "under transcriptional control" or "operatively linked" as used herein means that the promoter is in the correct location and orientation in relation to a polynucleotide to control the initiation of transcription by RNA polymerase and expression of the polynucleotide.

A "vector" is a composition of matter which comprises an isolated nucleic acid and which can be used to deliver the isolated nucleic acid to the interior of a cell. Numerous vectors are known in the art including, but not limited to, linear polynucleotides, polynucleotides associated with ionic or amphiphilic compounds, plasmids, and viruses. Thus, the term "vector" includes an autonomously replicating plasmid or a virus. The term should also be construed to include non-plasmid and non-viral compounds which facilitate transfer of nucleic acid into cells, such as, for example, polylysine compounds, liposomes, and the like. Examples of viral vectors include, but are not limited to, Sendai viral vectors, adenoviral vectors, adeno-associated virus vectors, retroviral vectors, lentiviral vectors, and the like.

As used herein, the term "genetic construct" refers to the DNA or RNA molecules that comprise a nucleotide sequence which encodes protein. The coding sequence includes initiation and termination signals operably linked to regulatory elements including a promoter and polyadenylation signal capable of directing expression in the cells of the individual to whom the nucleic acid molecule is administered.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Description

Peptide Ligands of the GFRAL-RET Receptor

The present invention relates to ligands for the glial cell-derived neurotrophic factor (GDNF) family receptor α-like (GFRAL)-RET (a receptor tyrosine kinase) receptor complex and, more specifically, to non-naturally occurring peptides specially designed to encourage or block the action of the native ligand growth and differentiation factor 15 (GDF15, also known as Macrophage inhibitory cytokine I (MIC-1). Importantly, the GFRAL-RET receptor complex is localized in the brainstem, specifically the nuclei of the dorsal vagal complex (including the area postrema, nucleus tractus solitarius and dorsal motor nucleus of the vagus). As the area postrema lies outside of the blood brain barrier—this implicates the GFRAL-RET receptor complex accessible to a peripheral-derived ligand action.

GDF15 is a transforming growth factor-β(TGF-β) superfamily protein. More specifically, it has been proposed that this protein belongs to the subgroup of glial-cell-derived neurotrophic factors (GDNFs). GDNF ligands include glial-cell-derived neurotrophic factor (GDNF), neurturin (NTN), artemin (ART), and persephin (PSP). These family ligands signal through GNDF receptor alpha (GFRα$_{1-4}$), respectively. Some cross talk occurs between the GDNF ligands and their receptors, but GDF15 is unable to activate any of the GFRα's. As discussed above, GDF15 is the native ligand for GFRAL-RET receptor complex.

The invention comprises the design of a series of non-naturally occurring peptides that can act as agonists or antagonists of the GFRAL receptor. The peptides that act as agonists may be used for the control of weight gain, for the control of obesity, or to treat sexual dysfunction. The peptides that act as antagonists may be used for treating unwanted anorexia, cachexia or for controlling nausea, emesis, gastrointestinal distress, gastroparesis, or other illness-like behaviors, including but not limited to the reduction of nausea, e.g. nausea associated with the use of chemotherapy drugs or nausea associated with cancer, morning sickness, or chronic illness.

In some embodiments, the peptides may act to control energy balance regulation. In some embodiments, the peptides regulate energy intake. In further embodiments, the peptides regulate energy expenditure (e.g. regulation of cardiac rate or locomotive activity). In some embodiments, the peptides regulate sleep and circadian rhythm.

The peptides may be conjugated to a vitamin B12 compound for preventing brain penetration, particularly the hypothalamus, and target peripheral sites of action only.

Provided herein are engineered peptides. The amino acid sequences for selected peptides is shown in Table 1.

Provided is an engineered peptide comprising any one of the amino acid sequences of SEQ ID NOs: 1-10. In some embodiments, at least one of the amino acids of the peptide is a modified amino acid.

In some embodiments, the engineered peptide is an antagonist of a GDNF family receptor alpha-like (GFRAL) receptor. In further embodiments, the antagonist comprises the amino acid sequence of SEQ ID NO: 5. Without wishing to be bound by theory, the GFRAL-RET receptor antagonist of the invention may be a competitive inhibitor, a non-competitive inhibitor and/or an allosteric inhibitor.

In some embodiments, the engineered peptide is an agonist of a GFRAL receptor. In further embodiments, the agonist comprises the amino acid sequence of SEQ ID NO: 1.

In some embodiments, the engineered peptide is linked to a vitamin B12 or precursor compound, or a polymer, or lipid or a fluorophore. In some embodiments, the vitamin B12 compound is cyanocobalamin, or aquocobalamin, or hydroxocobalamin, or methylcobalamin, or adenosylcobalamin. In some embodiments, the vitamin B12 precursor compound is dicyanocobinamide. In some embodiments, the lipid is Caprylic acid (C8), or Capric acid (C10), or Lauric acid (C12), or Myristic acid (C14), or Palmitic acid (C16) or Stearic acid (C18). In some embodiments, the fluorophore is Cy5, or Cy3, or Alexa555, or Alexa488. In some embodiments, the lipid is 16:0 PE. In further embodiments, the vitamin B12 compound, the lipid or the fluorophore is linked to the peptide directly or via a linker. In some embodiments, the linker is propargyl amine, or butargyl amine, or ethylene diamine, or polyethylene glycol. In yet further embodiments, the vitamin B12 compound, the lipid or the fluorophore is directly linked to any amino acid of the peptide. In some embodiments, the vitamin B12 compound, the lipid or the fluorophore is directly linked to any modified amino acid of the peptide. Also provided is the engineered peptide of any one of the previous embodiments, further comprising a metal ion bound to the peptide. In some embodiments, the metal ion is a $Zn^{2+}$ ion or a $Ca^{2+}$ ion.

Provided is a polynucleotide encoding the engineered peptide of any one of the previous embodiments.

Also provided is a pharmaceutical composition comprising the engineered peptide of any one of the previous embodiments.

Provided is a method of treating a disease in a subject in need thereof, comprising the step of administering the engineered peptide of any one of the previous embodiments. In some embodiments, the engineered peptide is an antagonist of a GFRAL-RET receptor. In some embodiments, the disease/illness treated is nausea, cachexia, pica, loss of appetite or anorexia nervosa. In further embodiments, the engineered peptide is administered systemically (e.g. subcutaneous or intravenous) in a dosage of 1 pmole/kg to 100 mmoles/kg, e.g., 10 pmoles/kg to 90 mmoles/kg, 20 pmoles/kg to 80 mmoles/kg, 30 pmoles/kg to 70 mmoles/kg, 40 pmoles/kg to 60 mmoles/kg, 50 pmoles/kg to 50 mmoles/kg, 60 pmoles/kg to 40 mmoles/kg, 70 pmoles/kg to 30 mmoles/kg, 80 pmoles/kg to 20 mmoles/kg, 90 pmoles/kg to 10 mmoles/kg, 100 pmoles/kg to 1 mmole/kg. In some embodiments the engineered peptide is administered acutely from 1 min or chronically over the course multiple hours/days, up to once per week. In yet further embodiments, the engineered peptide is administered acutely or chronically over the course of 1 min to 1, 2, 3, 4, 5, 6, 7, 8, 9, 10, 11, 12, 13, 14, 15, 16, 17, 18, 19, 20, 21, 22, 23, 24, or more hours. In yet further embodiments, the engineered peptide is administered over the course of 1, 2, 3, 4, 5, 6, 7, or more days. In yet further embodiments, the engineered peptide is administered once per week.

In some embodiments, the engineered peptide is an agonist of a GFRAL-RET receptor. In some embodiments, the disease or condition is obesity or body weight regulation. In further embodiments, the engineered peptide is administered in a dosage of 1 pmole/kg to 100 mmoles/kg, e.g., 10 pmoles/kg to 90 mmoles/kg, 20 pmoles/kg to 80 mmoles/kg, 30 pmoles/kg to 70 mmoles/kg, 40 pmoles/kg to 60 mmoles/kg, 50 pmoles/kg to 50 mmoles/kg, 60 pmoles/kg to 40 mmoles/kg, 70 pmoles/kg to 30 mmoles/kg, 80 pmoles/kg to 20 mmoles/kg, 90 pmoles/kg to 10 mmoles/kg, 100 pmoles/kg to 1 mmole/kg. In yet further embodiments, the engineered peptide is administered systemically (e.g. subcutaneous). In some embodiments the engineered peptide is administered acutely from 1 min or chronically over the course multiple hours/days, up to once per week. In yet further embodiments, the engineered peptide is administered acutely or chronically over the course of 1 min to 1, 2, 3, 4, 5, 6, 7, 8, 9, 10, 11, 12, 13, 14, 15, 16, 17, 18, 19, 20, 21, 22, 23, 24, or more hours. In yet further embodiments, the engineered peptide is administered over the course of 1, 2, 3, 4, 5, 6, 7, or more days. In yet further embodiments; the engineered peptide is administered once per week In some embodiments, the disease is sexual dysfunction. In further embodiments, the engineered peptide is administered in a dosage from 1 pmole/kg to 100 mmoles/kg, e.g., 10 pmoles/kg to 90 mmoles/kg, 20 pmoles/kg to 80 mmoles/kg, 30 pmoles/kg to 70 mmoles/kg, 40 pmoles/kg to 60 mmoles/kg, 50 pmoles/kg to 50 mmoles/kg, 60 pmoles/kg to 40 mmoles/kg, 70 pmoles/kg to 30 mmoles/kg, 80 pmoles/kg to 20 mmoles/kg, 90 pmoles/kg to 10 mmoles/kg, 100 pmoles/kg to 1 mmole/kg. In yet further embodiments, the engineered peptide is administered systemically (e.g. subcutaneous). In some embodiments the engineered peptide is administered acutely from 1 min or chronically over the course multiple hours/days, up to once per week. In yet further embodiments, the engineered peptide is administered acutely or chronically over the course of 1 min to 1, 2, 3, 4, 5, 6, 7, 8, 9, 10, 11, 12, 13, 14, 15, 16, 17, 18, 19, 20, 21, 22, 23, 24, or more hours. In yet further embodiments, the engineered peptide is administered over the course of 1, 2, 3, 4, 5, 6, 7, or more days. In yet further embodiments, the engineered peptide is administered once per week Provided is a method of promoting weight gain in a subject in need thereof, comprising the step of administering the engineered peptide of any one of the previous embodiments. In some embodiments, the engineered peptide is an agonist of a GFRAL receptor administered in a dosage of 1 pmole/kg to 100 mmoles/kg, e.g., 10 pmoles/kg to 90 mmoles/kg, 20 pmoles/kg to 80 mmoles/kg, 30 pmoles/kg to 70 mmoles/kg, 40 pmoles/kg to 60 mmoles/kg, 50 pmoles/kg to 50 mmoles/kg, 60 pmoles/kg to 40 mmoles/kg, 70 pmoles/kg to 30 mmoles/kg, 80 pmoles/kg to 20 mmoles/kg, 90 pmoles/kg to 10 mmoles/kg, 100 pmoles/kg to 1 mmole/kg. In yet further embodiments, the engineered peptide is administered systemically (e.g. subcutaneous). In some embodiments the engineered peptide is administered acutely from 1 min or chronically over the course multiple hours/days, up to once per week. In yet further embodiments, the engineered peptide is administered acutely or chronically over the course of 1 min to 1, 2, 3, 4, 5, 6, 7, 8, 9, 10, 11, 12, 13, 14, 15, 16, 17, 18, 19, 20, 21, 22, 23, 24, or more hours. In yet further embodiments, the engineered peptide is administered over the course of 1, 2, 3, 4, 5, 6, 7, or more days. In yet further embodiments, the engineered peptide is administered once per week Provided is a method of promoting weight loss in a subject in need thereof, comprising the step of administering the engineered peptide of any one of the previous embodiments. In some embodiments, the engineered peptide is an antagonist of a GFRAL receptor. In further embodiments, the engineered peptide is administered in a dosage of dosage of 1 pmole/kg to 100 mmoles/kg, e.g., 10 pmoles/kg to 90 mmoles/kg, 20 pmoles/kg to 80 mmoles/kg, 30 pmoles/kg to 70 mmoles/kg, 40 pmoles/kg to 60 mmoles/kg, 50 pmoles/kg to 50 mmoles/kg, 60 pmoles/kg to 40 mmoles/kg, 70 pmoles/kg to 30 mmoles/kg, 80 pmoles/kg to 20 mmoles/kg, 90 pmoles/kg to 10 mmoles/kg, 100 pmoles/kg to 1 mmole/kg. In yet further embodiments, the engineered peptide is administered systemically (i.e. subcutaneous). In some embodiments the engineered peptide is administered acutely from 1 min or chronically over the course multiple hours/days, up to once per week. In yet further embodiments, the engineered peptide is administered acutely or chronically over the course of linin to 1, 2, 3, 4, 5, 6, 7, 8, 9, 10, 11, 12, 13, 14, 15, 16, 17, 18, 19, 20, 21, 22, 23, 24, or more hours. In yet further embodiments, the engineered peptide is administered over the course of 1, 2, 3, 4, 5, 6, 7, or more days. In yet further embodiments, the engineered peptide is administered once per week The practice of the present invention employs, unless otherwise indicated, conventional techniques of molecular biology (including recombinant techniques), microbiology, cell biology, biochemistry and immunology, which are well within the purview of the skilled artisan. Such techniques are explained fully in the literature, such as, "Molecular Cloning: A Laboratory Manual", fourth edition (Sambrook, 2012); "Oligonucleotide Synthesis" (Gait, 1984); "Culture of Animal Cells" (Freshney, 2010); "Methods in Enzymology" "Handbook of Experimental Immunology" (Weir, 1997); "Gene Transfer Vectors for Mammalian Cells" (Miller and Calos, 1987); "Short Protocols in Molecular Biology" (Ausubel, 2002); "Polymerase Chain Reaction: Principles, Applications and Troubleshooting", (Babar, 2011); "Current Protocols in Immunology" (Coligan, 2002). These techniques are applicable to the production of the polynucleotides and polypeptides of the invention, and, as such, may be considered in making and practicing the invention. The engineered cytokines of the invention were codon optimized so as to enhance their ability to modulate the immune response in a mammal into which they are introduced. The invention includes sequences that are homologous to the sequences disclosed herein. Sequence homology for nucleotides and amino acids may be determined using FASTA, BLAST and Gapped BLAST (Altschul et al., Nuc. Acids Res., 1997, 25, 3389, which is incorporated herein by reference in its entirety) and PAUP* 4.0b10 software (D. L. Swofford, Sinauer Associates, Massachusetts). "Percentage of similarity" is calculated using PAUP* 4.0b10 software (D. L. Swofford, Sinauer Associates, Massachusetts). The average similarity of the consensus sequence is calculated compared to all sequences in the phylogenic tree.

Briefly, the BLAST algorithm, which stands for Basic Local Alignment Search Tool is suitable for determining sequence similarity (Altschul et al., J. Mol. Biol., 1990, 215, 403-410, which is incorporated herein by reference in its entirety). Software for performing BLAST analyses is publicly available through the National Center for Biotechnology Information. This algorithm involves first identifying high scoring sequence pair (HSPs) by identifying short words of length W in the query sequence that either match or satisfy some positive-valued threshold score T when aligned with a word of the same length in a database sequence. T is referred to as the neighborhood word score threshold (Altschul et al., supra). These initial neighborhood word hits act as seeds for initiating searches to find HSPs containing them. The word hits are extended in both directions along each sequence for as far as the cumulative alignment score can be increased. Extension for the word hits in each direction are halted when: 1) the cumulative alignment score falls off by the quantity X from its maximum achieved value; 2) the cumulative score goes to zero or below, due to the accumulation of one or more negative-scoring residue alignments; or 3) the end of either sequence is reached. The Blast algorithm parameters W, T and X determine the sensitivity and speed of the alignment. The Blast program uses as defaults a word length (W) of 11, the BLOSUM62 scoring matrix (see Henikoff et al., Proc. Natl. Acad. Sci. USA, 1992, 89, 10915-10919, which is incorporated herein by reference in its entirety) alignments (B) of 50, expectation (E) of 10, M=5, N=4, and a comparison of both strands. The BLAST algorithm (Karlin et al., Proc. Natl. Acad. Sci. USA, 1993, 90, 5873-5787, which is incorporated herein by reference in its entirety) and Gapped BLAST perform a statistical analysis of the similarity between two sequences. One measure of similarity provided by the BLAST algorithm is the smallest sum probability (P(N)), which provides an indication of the probability by which a match between two nucleotide sequences would occur by chance. For example, a nucleic acid is considered similar to another if the smallest sum probability in comparison of the test nucleic acid to the other nucleic acid is less than about 1, preferably less than about 0.1, more preferably less than about 0.01, and most preferably less than about 0.001.

When taken up by a cell, the genetic construct(s) may remain present in the cell as a functioning extrachromosomal molecule and/or integrate into the cell's chromosomal DNA. DNA may be introduced into cells where it remains as separate genetic material in the form of a plasmid or plasmids. Alternatively, linear DNA that can integrate into the chromosome may be introduced into the cell. When introducing DNA into the cell, reagents that promote DNA integration into chromosomes may be added. DNA sequences that are useful to promote integration may also be included in the DNA molecule. Alternatively, RNA may be administered to the cell. It is also contemplated to provide the genetic construct as a linear minichromosome including a centromere, telomeres and an origin of replication. Gene constructs may remain part of the genetic material in attenuated live microorganisms or recombinant microbial vectors which live in cells. Gene constructs may be part of genomes of recombinant viral vaccines where the genetic material either integrates into the chromosome of the cell or remains extrachromosomal. Genetic constructs include regulatory elements necessary for gene expression of a nucleic acid molecule. The elements include: a promoter, an initiation codon, a stop codon, and a polyadenylation signal. In addition, enhancers are often required for gene expression of the sequence that encodes the peptide. It is necessary that these elements be operable linked to the sequence that encodes the desired proteins and that the regulatory elements are operably in the individual to whom they are administered.

Initiation codons and stop codon are generally considered to be part of a nucleotide sequence that encodes the desired protein. However, it is necessary that these elements are functional in the individual to whom the gene construct is administered. The initiation and termination codons must be in frame with the coding sequence.

Promoters and polyadenylation signals used must be functional within the cells of the individual.

Examples of promoters useful to practice the present invention, especially in the production of a genetic vaccine for humans, include but are not limited to promoters from Simian Virus 40 (SV40), Mouse Mammary Tumor Virus (MMTV) promoter, Human Immunodeficiency Virus (MV) such as the BIV Long Terminal Repeat (LTR) promoter, Moloney virus, ALV, Cytomegalovirus (CMV) such as the CMV immediate early promoter, Epstein Barr Virus (EBV), Rous Sarcoma Virus (RSV) as well as promoters from human genes such as human Actin, human Myosin, human Hemoglobin, human muscle creatine and human metalothionein.

Examples of polyadenylation signals useful to practice the present invention, especially in the production of a genetic vaccine for humans, include but are not limited to SV40 polyadenylation signals and LTR polyadenylation signals. In particular, the SV40 polyadenylation signal that is in pCEP4 plasmid (Invitrogen, San Diego Calif.), referred to as the SV40 polyadenylation signal, is used.

In addition to the regulatory elements required for DNA expression, other elements may also be included in the DNA molecule. Such additional elements include enhancers. The enhancer may be selected from the group including but not limited to: human Actin, human Myosin, human Hemoglobin, human muscle creatine and viral enhancers such as those from CMV, RSV and EBV.

Genetic constructs can be provided with mammalian origin of replication in order to maintain the construct extrachromosomally and produce multiple copies of the construct in the cell. Plasmids pVAX1, pCEP4 and pREP4 from Invitrogen (San Diego, Calif.) contain the Epstein Barr virus origin of replication and nuclear antigen EBNA-1 coding region which produces high copy episomal replication without integration. In order to maximize peptide production, regulatory sequences may be selected which are well suited for gene expression in the cells the construct is administered into. Moreover, codons may be selected which are most efficiently transcribed in the cell. One having ordinary skill in the art can produce DNA constructs that are functional in the cells. In some embodiments for which protein is used, i.e., the engineered peptides of the invention, for example, one having ordinary skill in the art can, using well known techniques, produce and isolate peptides of the invention using well known techniques. In some embodiments for which protein is used, for example, one having ordinary skill in the art can, using well known techniques, inserts DNA molecules that encode a protein of the invention into a commercially available expression vector for use in well-known expression systems. For example, the commercially available plasmid pSE420 (Invitrogen, San Diego, Calif.) may be used for production of protein in *E. coli*. The commercially available plasmid pYES2 (Invitrogen, San Diego, Calif.) may, for example, be used for production in *S. cerevisiae* strains of yeast. The commercially available MAXBAC™ complete baculovirus expression system (Invitrogen, San Diego, Calif.) may, for example, be used for production in insect cells. The commercially available plasmid pcDNA I or pcDNA3 (Invitrogen, San Diego, Calif.) may, for example, be used for production in mammalian cells such as Chinese Hamster Ovary cells. One having ordinary skill in the art can use these commercial expression vectors and systems or others to produce protein by routine techniques and readily available starting materials. (See e.g., Sambrook et al., Molecular Cloning, Third Ed. Cold Spring Harbor Press (2001) which is incorporated herein by reference.) Thus, the desired peptides can be prepared in both prokaryotic and eukaryotic systems, resulting in a spectrum of processed forms of the peptide.

One having ordinary skill in the art may use other commercially available expression vectors and systems or produce vectors using well known methods and readily available starting materials. Expression systems containing the requisite control sequences, such as promoters and polyadenylation signals, and preferably enhancers are readily available and known in the art for a variety of hosts. See e.g., Sambrook et al., Molecular Cloning Third Ed. Cold Spring Harbor Press (2001). Genetic constructs include the protein coding sequence operably linked to a promoter that is functional in the cell line into which the constructs are transfected. Examples of constitutive promoters include promoters from cytomegalovirus or SV40. Examples of inducible promoters include mouse mammary leukemia virus or metallothionein promoters. Those having ordinary skill in the art can readily produce genetic constructs useful for transfecting with cells with DNA that encodes protein of the invention from readily available starting materials. The expression vector including the DNA that encodes the peptide is used to transform the compatible host which is then cultured and maintained under conditions wherein expression of the foreign DNA takes place.

The protein produced is recovered from the culture, either by lysing the cells or from the culture medium as appropriate and known to those in the art. One having ordinary skill in the art can, using well known techniques, isolate peptide that is produced using such expression systems. The methods of purifying protein from natural sources using antibodies which specifically bind to a specific peptide as described above may be equally applied to purifying peptide produced by recombinant DNA methodology.

In addition to producing peptides by recombinant techniques, automated peptide synthesizers may also be employed to produce isolated, essentially pure peptide. Such techniques are well known to those having ordinary skill in the art and are useful if derivatives which have substitutions not provided for in DNA-encoded protein production.

The polynucleotides encoding the engineered peptides of the invention may be delivered using any of several well-known technologies including DNA injection (also referred to as DNA vaccination), recombinant vectors such as recombinant adenovirus, recombinant adenovirus associated virus and recombinant vaccinia virus.

Routes of administration include, but are not limited to, intramuscular, intranasally, intraperitoneal, intradermal, subcutaneous, intravenous, intraarterially, intraocularly and oral as well as topically, transdermally, by inhalation or suppository or to mucosal tissue such as by lavage to vaginal, rectal, urethral, buccal and sublingual tissue. Preferred routes of administration include intramuscular, intraperitoneal, intradermal and subcutaneous injection. Genetic constructs may be administered by means including, but not limited to, electroporation methods and devices, traditional syringes, needleless injection devices, or "microprojectile bombardment gone guns".

Pharmaceutical Compositions and Dosing Regimens

Administration of the compositions of the invention is typically parenteral, by subcutaneous, intravenous, intramuscular, or intraperitoneal injection, or by infusion or by any other acceptable systemic method. In a preferred embodiment, administration is by subcutaneous injection. In another preferred embodiment, administration is by intravenous infusion, which may typically take place over a time course of about 1 to 5 hours. In addition, there are a variety of oral delivery methods for administration of therapeutic peptides, and these can be applied to the therapeutic peptides of this invention.

Often, treatment dosages are titrated upward from a low level to optimize safety and efficacy. Generally, daily dosages will fall within a range of about 0.01 to 20 mg peptide per kilogram of body weight. Typically, the dosage range will be from about 0.1 to 5 mg peptide per kilogram of body weight. Various modifications or derivatives of the peptides, such as addition of polyethylene glycol chains (PEGylation), lipidation or linkage to a vitamin B12 compound, may be made to influence their pharmacokinetic and/or pharmacodynamic properties.

To administer the peptide by other than parenteral administration, it may be necessary to coat the peptide with, or co-administer the peptide with, a material to prevent its inactivation. For example, peptide may be administered in an incomplete adjuvant, co-administered with enzyme inhibitors or in liposomes. Enzyme inhibitors include pancreatic trypsin inhibitor, diisopropylfluorophosphate (DEP) and trasylol. Liposomes include water-in-oil-in-water CGF emulsions as well as conventional liposomes (Strejan et al., 1984, J Neuroimmunol. 7:27).

Although the compositions of the invention can be administered in simple solution, they are more typically used in combination with other materials such as carriers, preferably pharmaceutically acceptable carriers. Useful pharmaceutically acceptable carriers can be any compatible, non-toxic substance suitable for delivering the compositions of the invention to a patient. Sterile water, alcohol, fats, waxes, and inert solids may be included in a carrier. Pharmaceutically acceptable adjuvants (buffering agents, dispersing agents) may also be incorporated into the pharmaceutical composition. Generally, compositions useful for parenteral administration of such drugs are well known; e.g., *Remington's Pharmaceutical Science,* 17th Ed. (Mack Publishing Company, Easton, Pa., 1990). Alternatively, compositions of the invention may be introduced into a patient's body by implantable drug delivery systems (Urquhart et al., 1984, *Ann. Rev. Pharmacol. Toxicol.* 24:199).

Therapeutic formulations may be administered in many conventional dosage formulations. Formulations typically comprise at least one active ingredient, together with one or more pharmaceutically acceptable carriers. Formulations may include those suitable for oral, rectal, nasal, or parenteral (including subcutaneous, intramuscular, intravenous and intradermal) administration.

The formulations may conveniently be presented in unit dosage form and may be prepared by any methods well known in the art of pharmacy. See, e.g., Gilman et al. (eds.) (1990), *The Pharmacological Bases of Therapeutics,* 8th Ed., Pergamon Press; and *Remington's Pharmaceutical Sciences,* supra, Easton, Pa.; Avis et al. (eds.) (1993) *Pharmaceutical Dosage Forms: Parenteral Medications,* Dekker, N.Y.; Lieberman et al. (eds.) (1990) *Pharmaceutical Dosage Forms: Tablets,* Dekker, N.Y.; and Lieberman et al. (eds.) (1990), *Pharmaceutical Dosage Forms: Disperse Systems,* Dekker, N.Y.

The pharmaceutical compositions according to the present invention are formulated according to the mode of administration to be used. In cases where pharmaceutical compositions are injectable pharmaceutical compositions, they are sterile, pyrogen free and particulate free. An isotonic formulation is preferably used. Generally, additives for isotonicity can include sodium chloride, dextrose, mannitol, sorbitol and lactose. In some cases, isotonic solutions such as phosphate buffered saline are preferred. Stabilizers include gelatin and albumin. In some embodiments, a vasoconstriction agent is added to the formulation.

In additional embodiments, the present invention contemplates administration of the peptides by gene therapy methods, e.g., administration of an isolated nucleic acid encoding a peptide of interest. The peptides of the present invention have been well-characterized, both as to the nucleic acid sequences encoding the peptides and the resultant amino acid sequences of the peptides. Engineering of such isolated nucleic acids by recombinant DNA methods is well within the ability of one skilled in the art. Codon optimization, for purposes of maximizing recombinant protein yields in particular cell backgrounds, is also well within the ability of one skilled in the art. Administration of an isolated nucleic acid encoding the fusion protein is encompassed by the expression "administering a therapeutically effective amount of a fusion protein of the invention." Gene therapy methods are well known in the art. See, e.g., WO96/07321 which discloses the use of gene therapy methods to generate intracellular antibodies. Gene therapy methods have also been successfully demonstrated in human patients. See, e.g., Baumgartner et al., 1998, *Circulation* 97: 12, 1114-1123, and more recently, Fatham, 2007, "A gene therapy approach to treatment of autoimmune diseases," *Immun. Res.* 18:15-26; and U.S. Pat. No. 7,378,089, both incorporated herein by reference. See also Bainbridge et al., 2008, "Effect of gene therapy on visual function in Leber's congenital Amaurosis," *N Engl Med* 358:2231-2239; and Maguire et al., 2008, "Safety and efficacy of gene transfer for Leber's congenital Amaurosis," *N Engl J Med* 358:2240-8. There are two major approaches for introducing a nucleic acid encoding the peptide (optionally contained in a vector) into a patient's cells: in vivo and ex vivo. For in vivo delivery, the nucleic acid is injected directly into the patient, usually at the site where the peptide is required. For ex vivo treatment, the patient's cells are removed, the nucleic acid is introduced into these isolated cells and the modified cells are administered to the patient either directly or, for example, encapsulated within porous membranes which are implanted into the patient (see, e.g., U.S. Pat. Nos. 4,892,538 and 5,283,187). There are a variety of techniques available for introducing nucleic acids into viable cells. The techniques vary depending upon whether the nucleic acid is transferred into cultured cells in vitro, or in vivo in the cells of the intended host. Techniques suitable for the transfer of nucleic acid into mammalian cells in vitro include the use of liposomes, electroporation, microinjection, cell fusion, DEAE-dextran, the calcium phosphate precipitation method, etc. Commonly used vectors for ex vivo delivery of the gene are retroviral and lentiviral vectors.

Preferred in vivo nucleic acid transfer techniques include transfection with viral vectors such as adenovirus, Herpes simplex I virus, adeno-associated virus), lipid-based systems (useful lipids for lipid-mediated transfer of the gene are DOTMA, DOPE and DC-Chol, for example), naked DNA and transposon-based expression systems. For review of the currently known gene marking and gene therapy protocols see Anderson et al., *Science* 256:808-813 (1992). See also WO 93/25673 and the references cited therein.

"Gene therapy" includes both conventional gene therapy where a lasting effect is achieved by a single treatment, and the administration of gene therapeutic agents, which involves the one time or repeated administration of a therapeutically effective DNA or mRNA. Oligonucleotides can be modified to enhance their uptake, e.g. by substituting their negatively charged phosphodiester groups by uncharged groups. Peptides of the present invention can be delivered using gene therapy methods, for example locally in tumor beds, intrathecally, or systemically (e.g., via vectors that selectively target specific tissue types, for example, tissue-specific adeno-associated viral vectors). In some embodiments, primary cells (such as lymphocytes or stem cells) from the individual can be transfected ex vivo with a gene encoding any of the fusion proteins of the present invention, and then returning the transfected cells to the individual's body.

"Treating" or "treatment" refers to therapeutic treatment, wherein the object is to prevent or slow down (lessen) the targeted pathologic condition or disorder. A subject is successfully "treated" if: after receiving a therapeutic amount of a peptide of the invention according to the methods of the present invention, the subject shows observable and/or measurable reduction in or absence of one or more signs and symptoms of the particular disease. Reduction of the signs or symptoms of a disease may also be felt by the patient. Treatment can achieve a complete response, defined as disappearance of all signs of cancer, or a partial response, wherein the size of the tumor is decreased, preferably by more than 50%, more preferably by 75%. A patient is also considered treated if the patient experiences a stabilization of disease. These parameters for assessing successful treatment and improvement in the disease are readily measurable by routine procedures familiar to a physician of appropriate skill in the art.

Design of Peptides

TABLE 1

| SEQ ID NO: | Peptide Name | Peptide Sequence |
|---|---|---|
| 1 | GFANT01 | EDDVSFQK*L DDNVRYHTLR K |
| 2 | GFANT02 | DDDLSFQK*L DDNVYYHLLR K |
| 3 | GFANT03 | K*LDDNVYYH LLRK |
| 4 | GFANT04 | K*PMVLIQKT DTGVSLQTYD |
| 5 | GFANT05 | TK*EELIHAH ADPMVLIQKT DTGVSLQTYD |
| 6 | GFANT06 | VLSPREVQHA HADPMVLIQK TDTGVSLQTY D |
| 7 | GFANT07 | VLSPREVQHA HADPMVLI |

TABLE 1-continued

| SEQ ID NO: | Peptide Name | Peptide Sequence |
|---|---|---|
| 8 | GFANT08 | VITPREVQHA HADPMILIQK TDSGISIQSY E |
| 9 | GFANT09 | VITPREVQHA HADPMILI |
| 10 | GFANT10 | TKEELIHAHA DPMILIQKTD SGISIQSYE |

*Lysines marked with an asterisk (K*) may be wildtype (K) or azido (K(N$_3$)), or otherwise modified In some embodiments, at least one of the amino acids of the peptide is a modified amino acid. In some embodiments, the peptide wherein at least one of its amino acids is a modified amino acid is an agonist of a GFRAL receptor. In further embodiments, the peptide wherein at least one of its amino acids is a modified amino acid is an antagonist of a GFRAL receptor.

The practice of the invention is illustrated by the following non-limiting examples. The invention should not be construed to be limited solely to the compositions and methods described herein, but should be construed to include other compositions and methods as well. One of skill in the art will know that other compositions and methods are available to perform the procedures described herein.

The practice of the present invention employs, unless otherwise indicated, conventional techniques of molecular biology (including recombinant techniques), microbiology, cell biology, biochemistry and immunology, which are well within the purview of the skilled artisan. Such techniques are explained fully in the literature, such as, "Molecular Cloning: A Laboratory Manual", fourth edition (Sambrook, 2012); "Oligonucleotide Synthesis" (Gait, 1984); "Culture of Animal Cells" (Freshney, 2010); "Methods in Enzymology" "Handbook of Experimental Immunology" (Weir, 1997); "Gene Transfer Vectors for Mammalian Cells" (Miller and Calos, 1987); "Short Protocols in Molecular Biology" (Ausubel, 2002); "Polymerase Chain Reaction: Principles, Applications and Troubleshooting", (Babar, 2011); "Current Protocols in Immunology" (Coligan, 2002). These techniques are applicable to the production of the polynucleotides and polypeptides of the invention, and, as such, may be considered in making and practicing the invention. Particularly useful techniques for particular embodiments will be discussed in the sections that follow.

EXPERIMENTAL EXAMPLES

The invention is further described in detail by reference to the following experimental examples. These examples are provided for the purposes of illustration only and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrating examples, make and utilize the compounds of the present invention and practice the claimed methods. The following working examples therefore specifically point out the preferred embodiments of the present invention, and are not to be construed as limiting in any way the remainder of the disclosure.

Figure 2A:
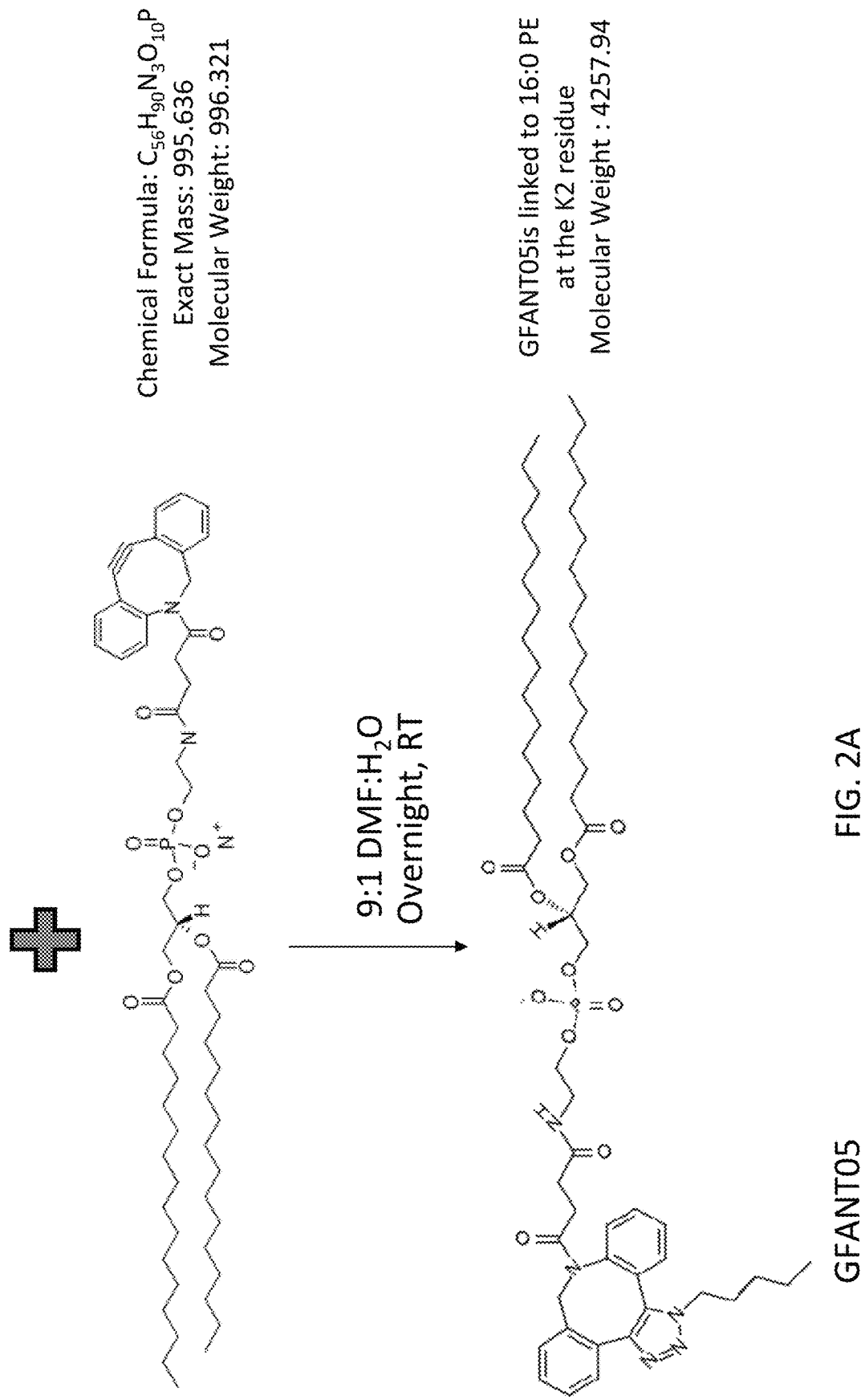
FIG. 2A shows the method of production GFANT05 peptide conjugated with palmitic acid, wherein the GFANT05 peptide of SEQ ID NO: 5 has a modified lysine (K azido) in position K2. The GFANT05 peptide is linked to 16:0 PE at the K2 residue.
Figure 2B:
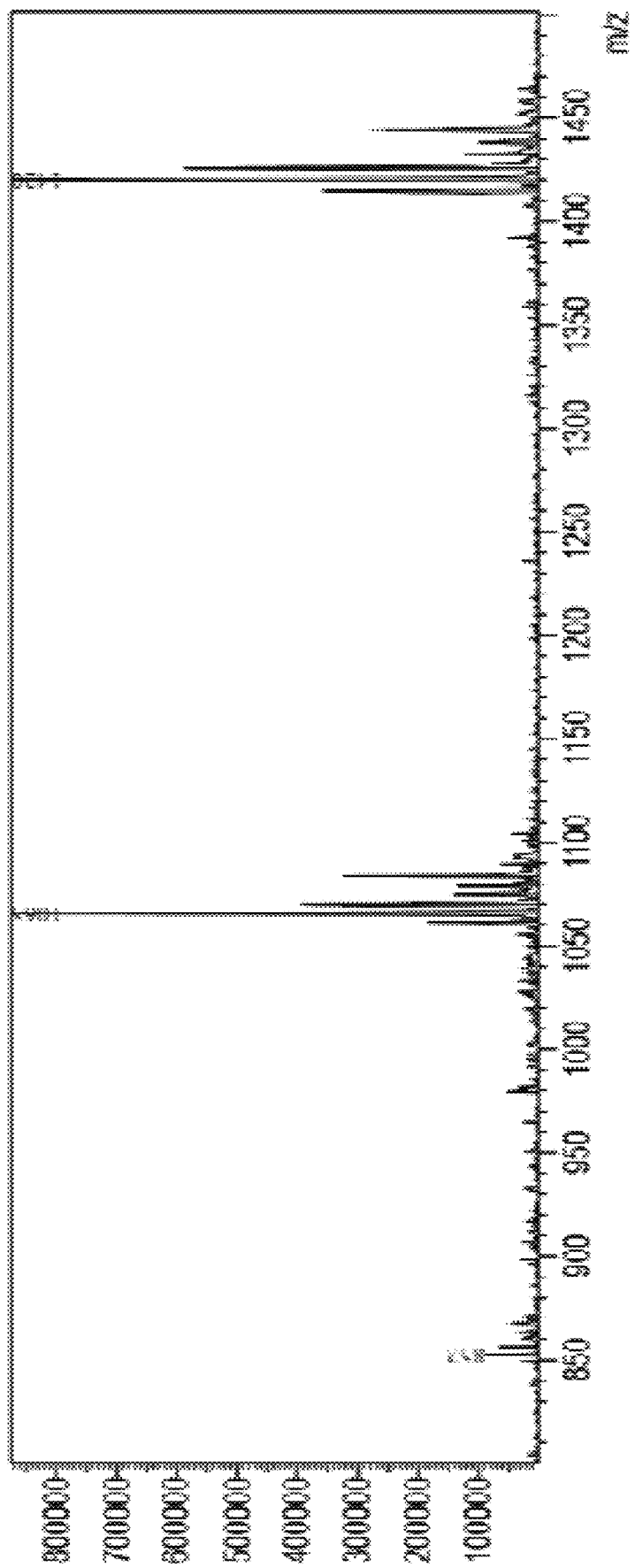
FIG. 2B shows the results of electrospray mass spectrometry on the GFANT05 conjugated synthesis product.

Example 1—Peptide Design and Conjugation of GFANT05 with or without Palmitic Acid Putative agonistic and antagonistic peptide ligands of the GFRAL receptor were predicted using in silico analysis of known peptide ligands that bind across the GDF family (Table 1). In some of the peptides of Table 1 (GFANT05-GFANT10), addition of a metal (e.g Ca$^{2+}$ or Zn$^{2+}$) binding motif (HAHAD) was introduced to incorporate possible secondary structure changes to the peptide and/or to facilitate interaction with the receptor. In some embodiments, the peptides have additional residues from human GDF15 known to interact with the GFRAL receptor. In addition, specific residues were modified in order to help increase noncovalent interactions and modify hydrophilicity of the peptide, as suggested by modeling Five peptides from Table 1 (GFANT01-GFANT05, SEQ. ID NOs 1-5, wherein the K* in each peptide is Lysine(N$_3$)) were synthesized. The peptides are capable of being conjugated to a lipid. GFANT05 was incubated with palmitic acid overnight at room temperature to produce GFANT conjugated to palmitic acid (FIG. 2A). The resulting molecule was subjected to electrospray mass spectrometry to confirm proper production of the GFANT05 product.

Figure 3A:
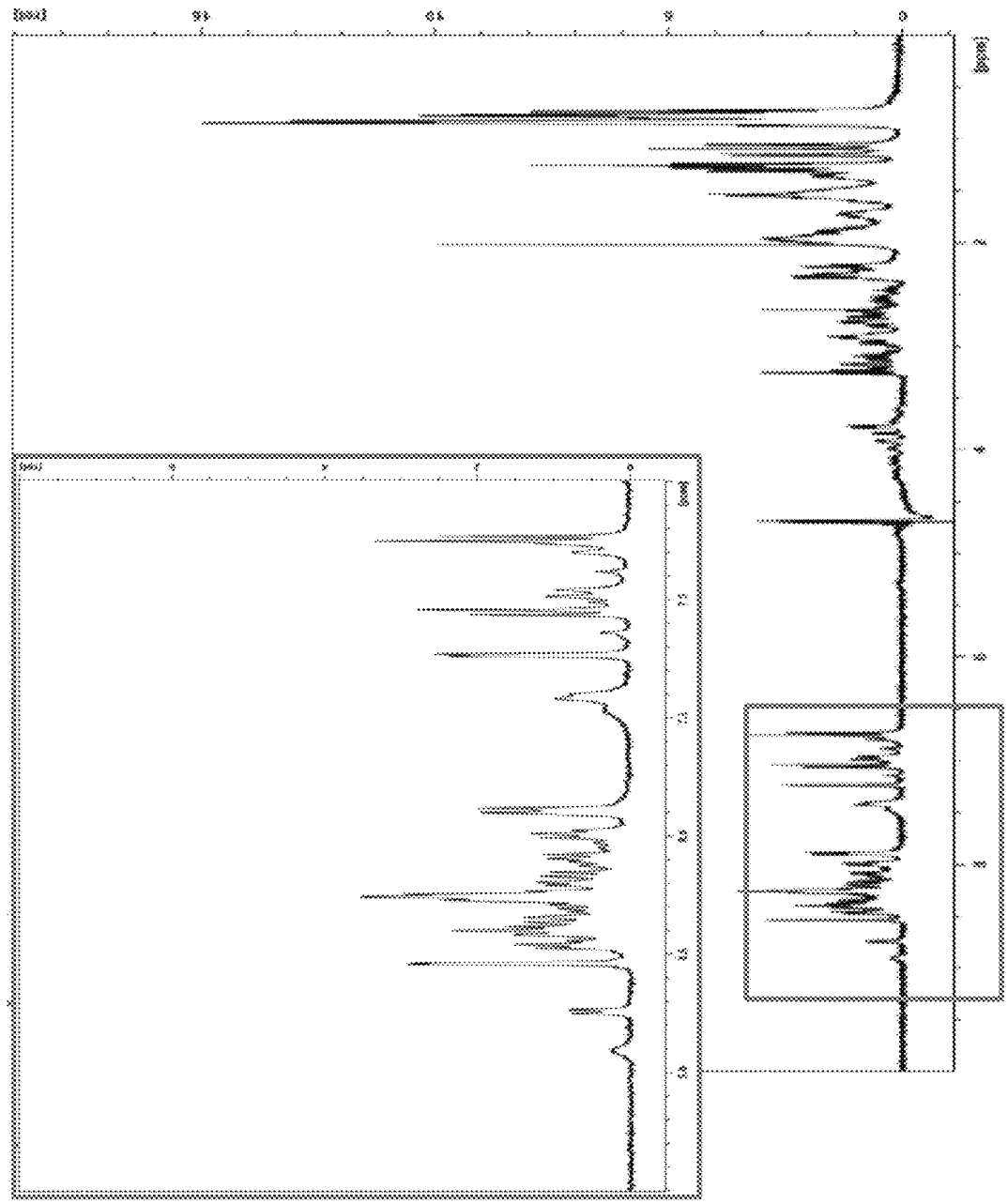
FIG. 3A shows a 1H NMR structure of GFANT05, which reveals a broad spread of peaks consistent with a folded state for this peptide.
Figure 3B:
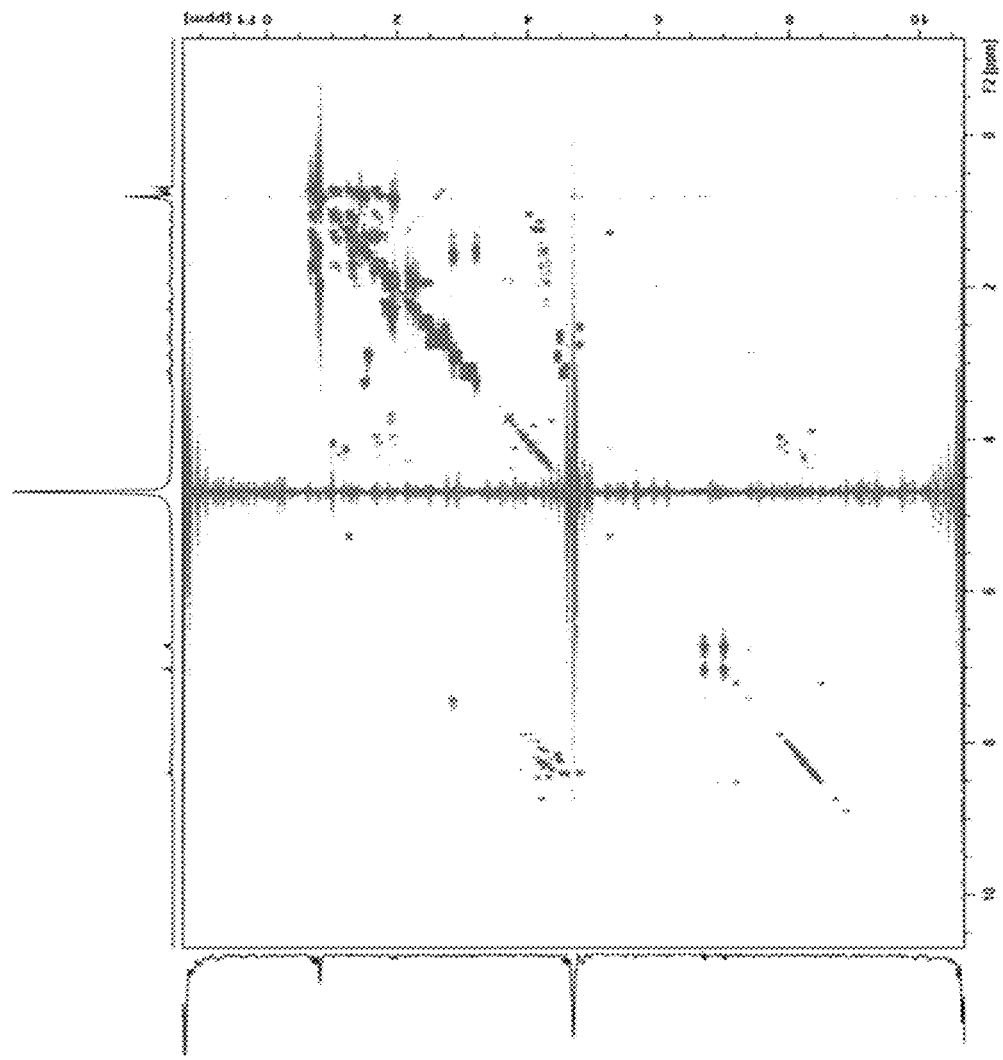
FIG. 3B displays the 2D spectra COSY NMR structure of the GFANT05 peptide.
Figure 3C:
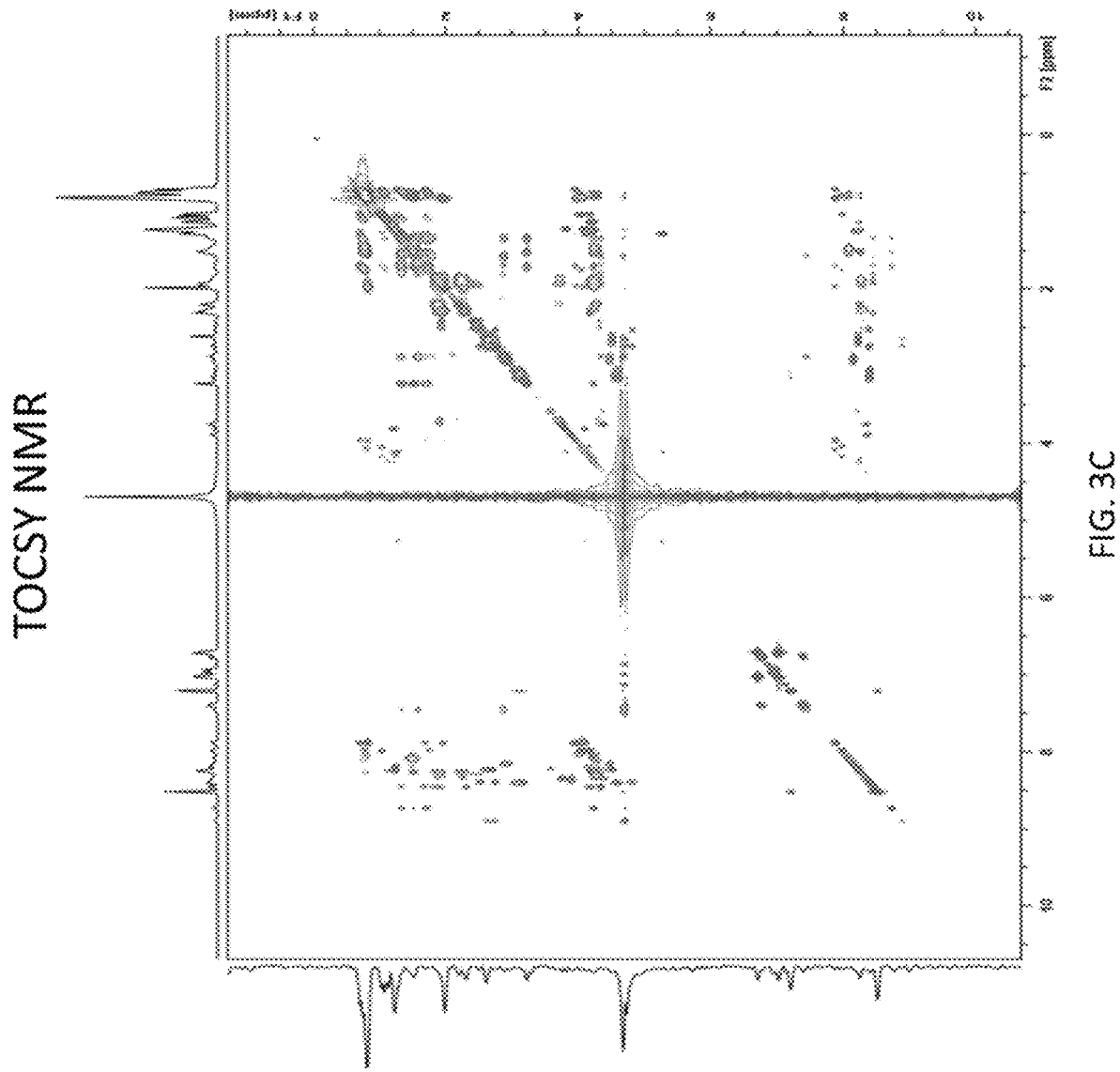
FIG. 3C shows the 2D spectra TOCSY NMR structure of the GFANT05 peptide. Both FIGS. 3B and 3C suggest that the structure of GFANT05 contains at least one alpha helix.

1H NMR analysis of the GFANT05 peptide alone revealed a broad spectrum of peaks consistent with a folded state (FIG. 3A). Further 2D NMR analysis revealed that the GFANT05 peptide consisted of at least one alpha helix (FIG. 3B-3C).

Example 2—ELISA Assay

Figure 4:
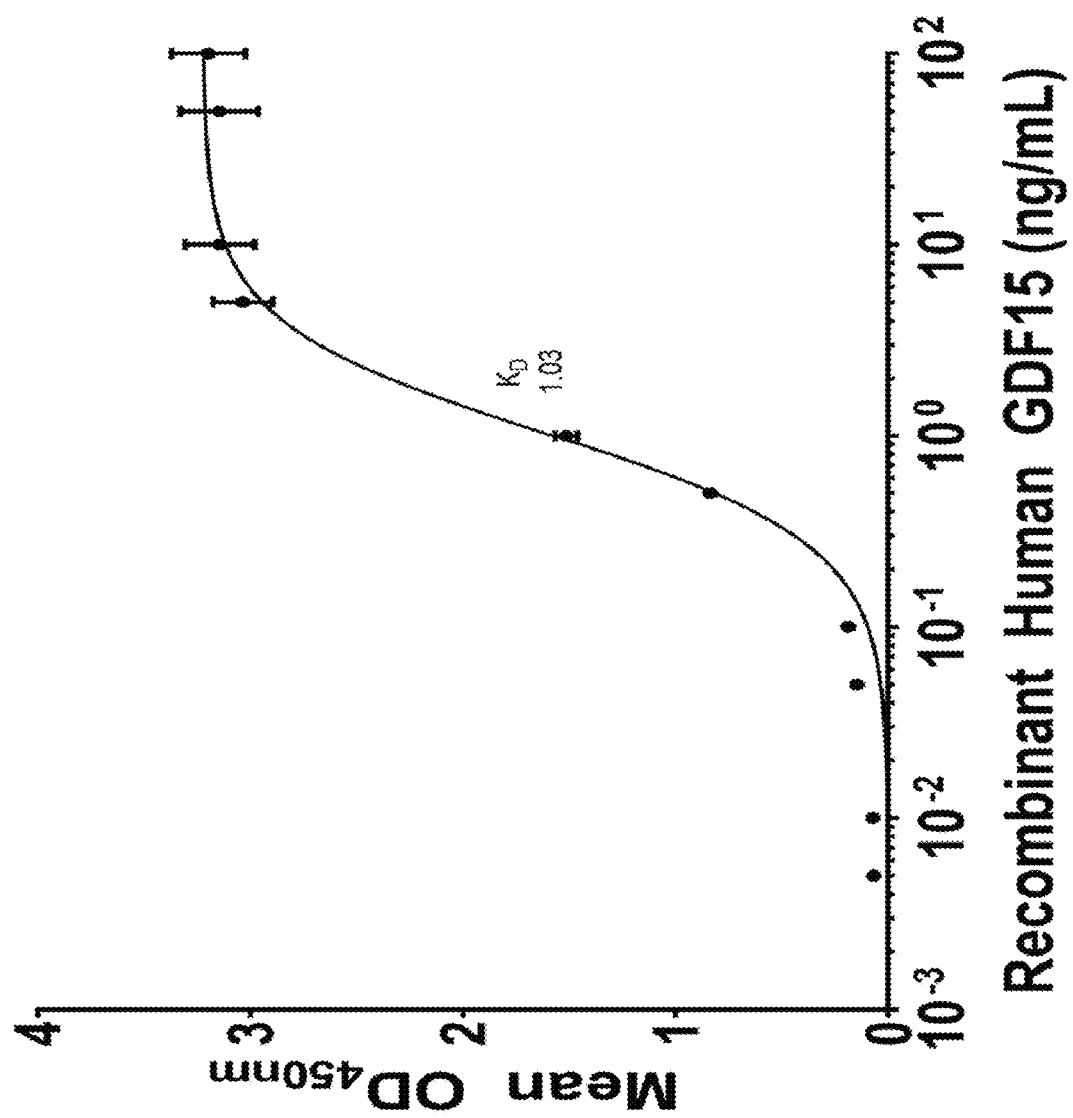
FIG. 4 shows the results of an ELISA binding assay measuring the affinity of Recombinant human GDF-15 (rhGDF15) for its receptor.

To validate binding of the synthesized peptides to the GFRAL receptor, an ELISA assay was developed to determine the binding affinity of the peptides for their receptor. The primary antibody (Abcam ab206414) was diluted to 1 µg/mL. The secondary antibody was diluted by placing 5 µL into 10 mL assay buffer. GDF15 was run at concentrations of 100 ng/mL to 0.005 ng/mL. The recombinant human GFRα-like His-tag receptor (R&D 9647-GR-050) was added to the Pierce™ nickel coated plate (ThermoFisher Scientific 15442) at 0.1 µg/mL in a total volume of 100 µL. The $K_D$ was determined to be 1.03 ng/mL, consistent with published values, thus demonstrating that the ELISA is functional (FIG. 4A). These data reveal a novel ELISA assay that can be utilized to test the ability of the artificial peptides to bind GFRAL.

Example 3—Nausea/Malaise (i.e. Illness-Like Behaviors) Studies in Rats

Figure 5A:
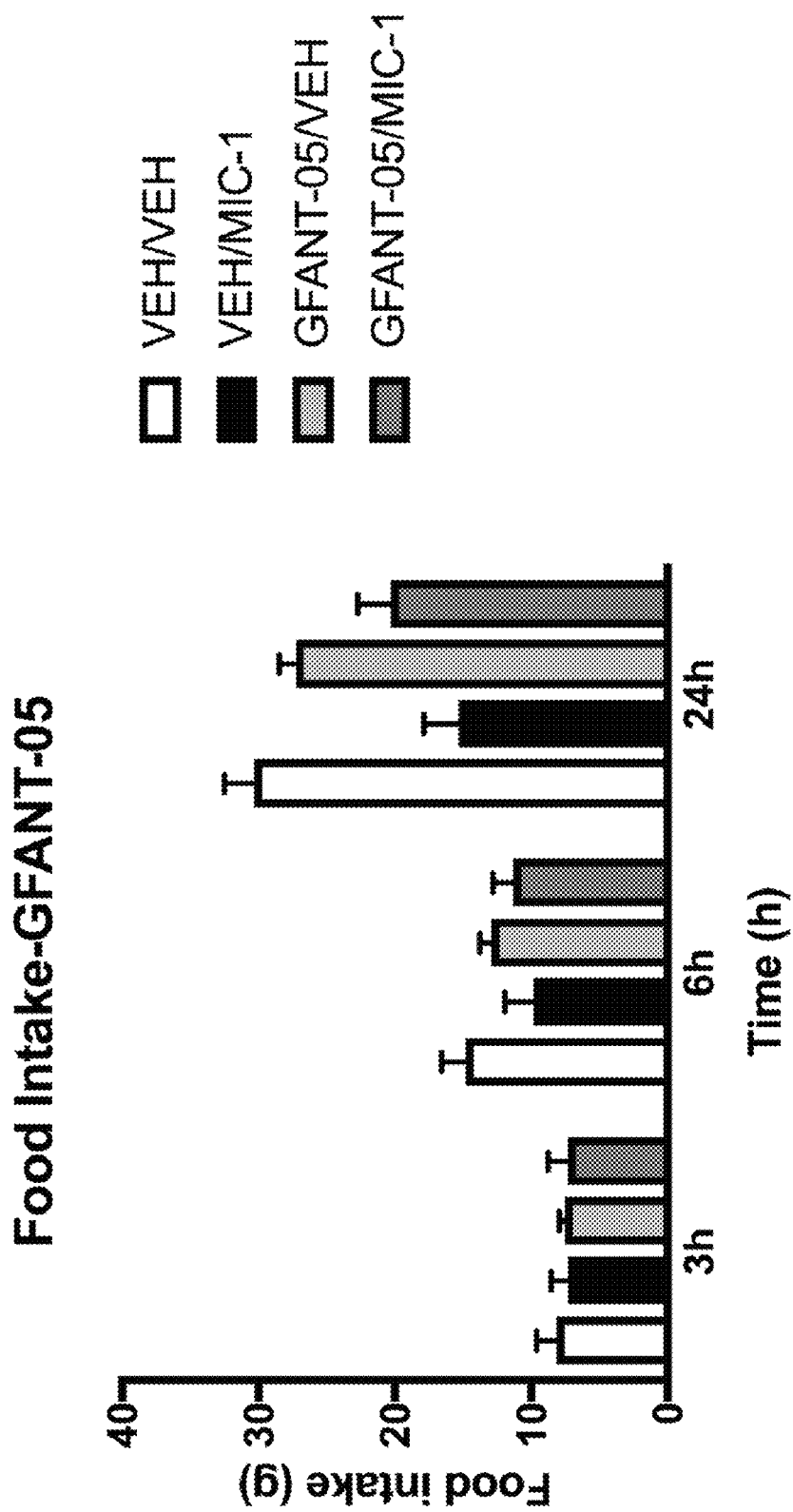
FIG. 5A is a graph of a food intake study performed to evaluate the efficacy of unconjugated GFANT05 peptide (TK*EELIHAHADPMVLIQKTDTGVSLQTYD; SEQ ID NO: 5, wherein K* is K azido) to reduce nausea.
Figure 5B:
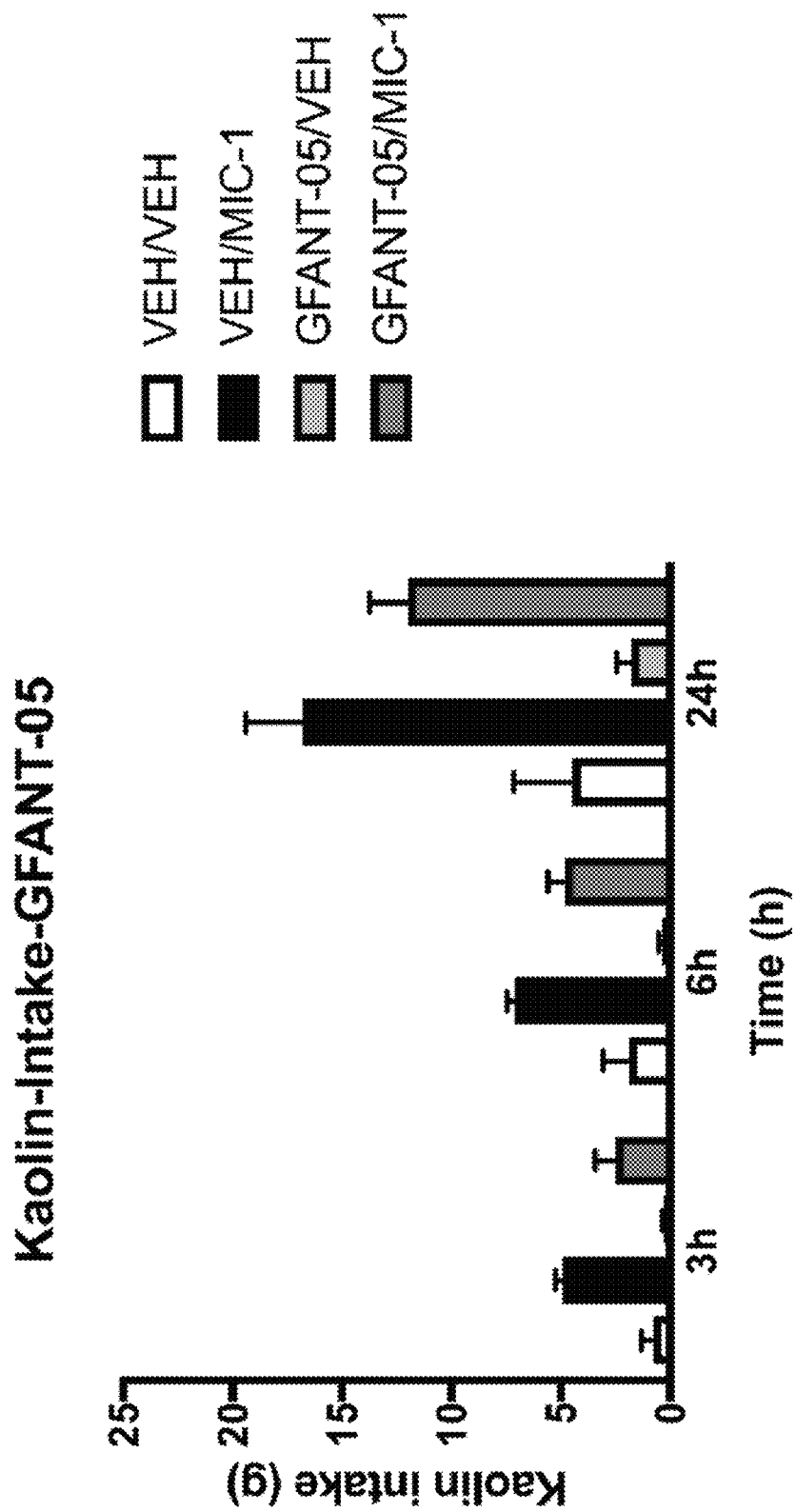
FIG. 5B shows a graph of a kaolin intake study performed to evaluate the efficacy of unconjugated GFANT05 peptide in reducing nausea.
Figure 6:
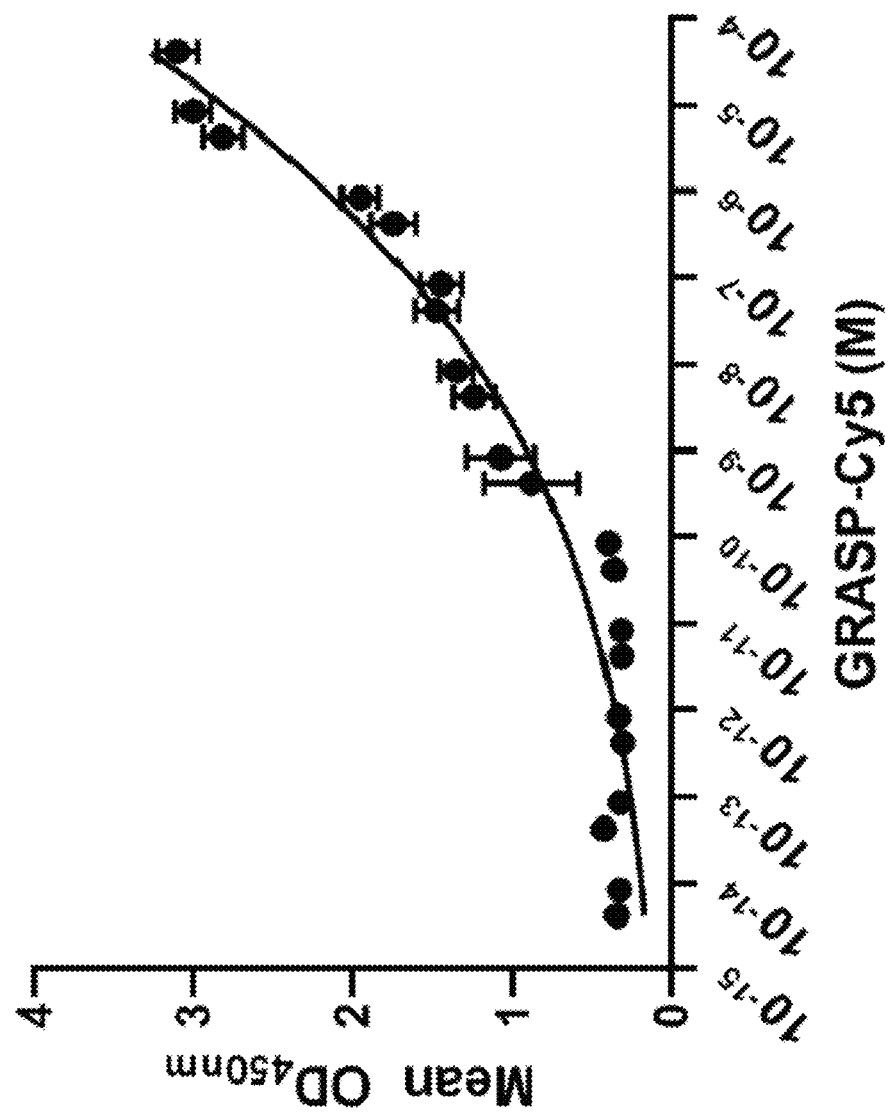
FIG. 6 is a graph confirming GFRAL receptor antagonist binding to the GFRAL receptor. A Cy5-conjugate of GFRAL receptor antagonist was synthesized and exposed to the human GFRAL receptor in vitro and tracked for binding using an anti-Cy5 antibody.
Figure 7:
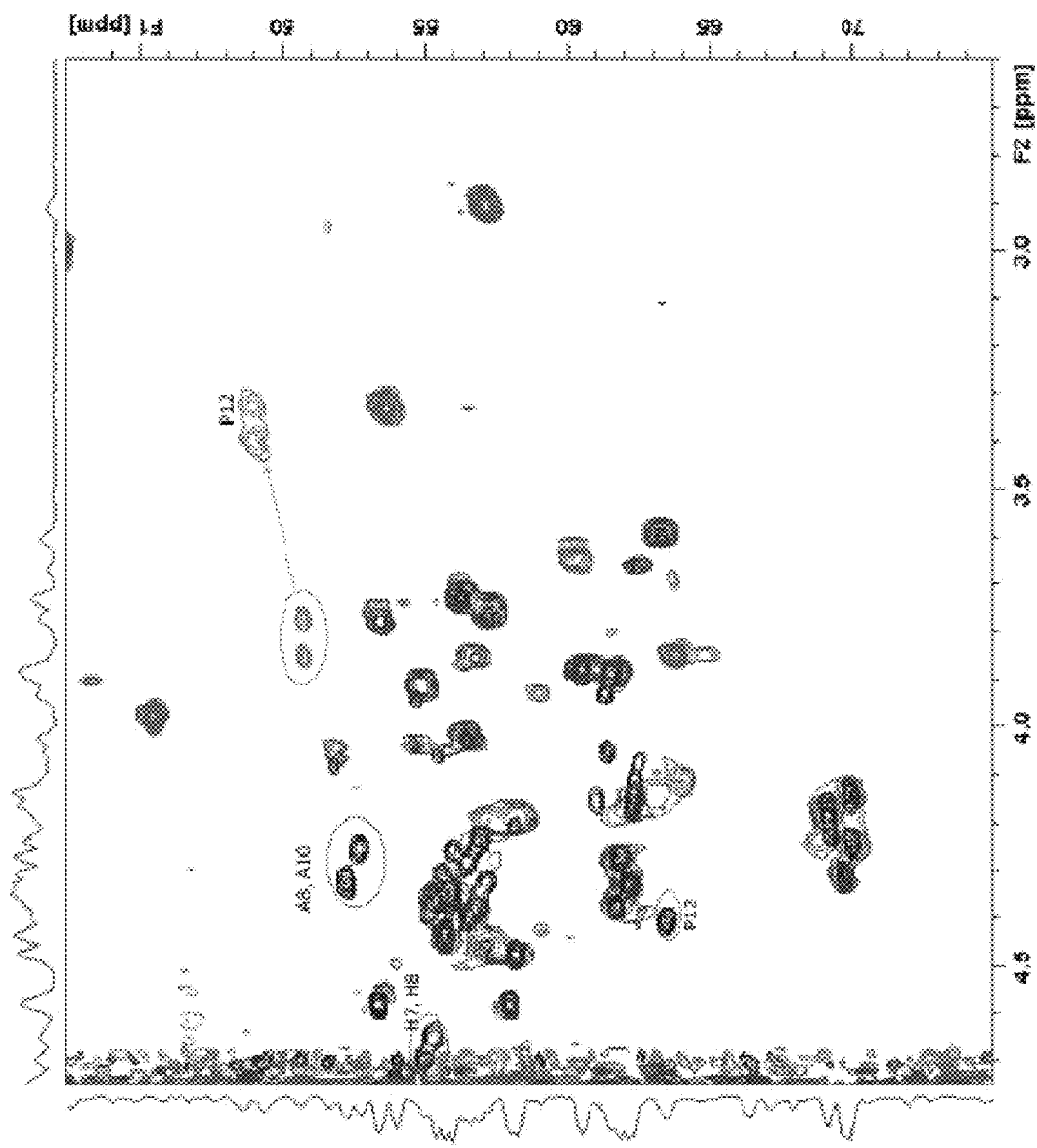
FIG. 7 is a graph confirming Zinc binding to GFRAL receptor antagonist at the HAHAD region (residues H7-P12) as observed by chemical shifts in 2D NMR.
Figure 8:
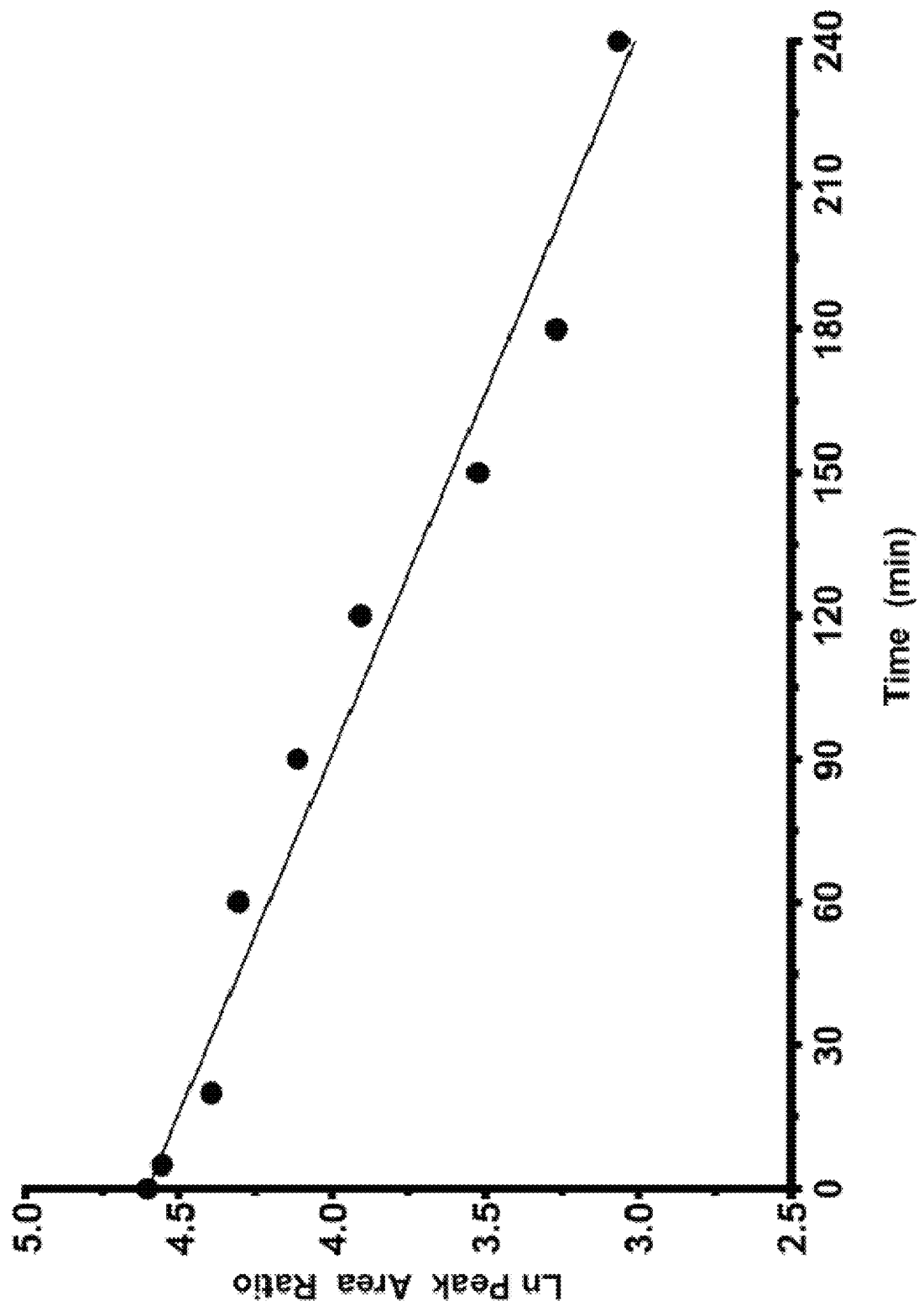
FIG. 8 is a graph illustrating the results from in vitro PK study of GFRAL receptor antagonist in rat microsomes. The half-life was calculated to be: 104.43 min. Reaction velocity (V) was calculated to be 511 uL/1 mg. Intrinsic clearance (Cl-int) was determined to be 339 uL/min/mg protein.
Figure 9:
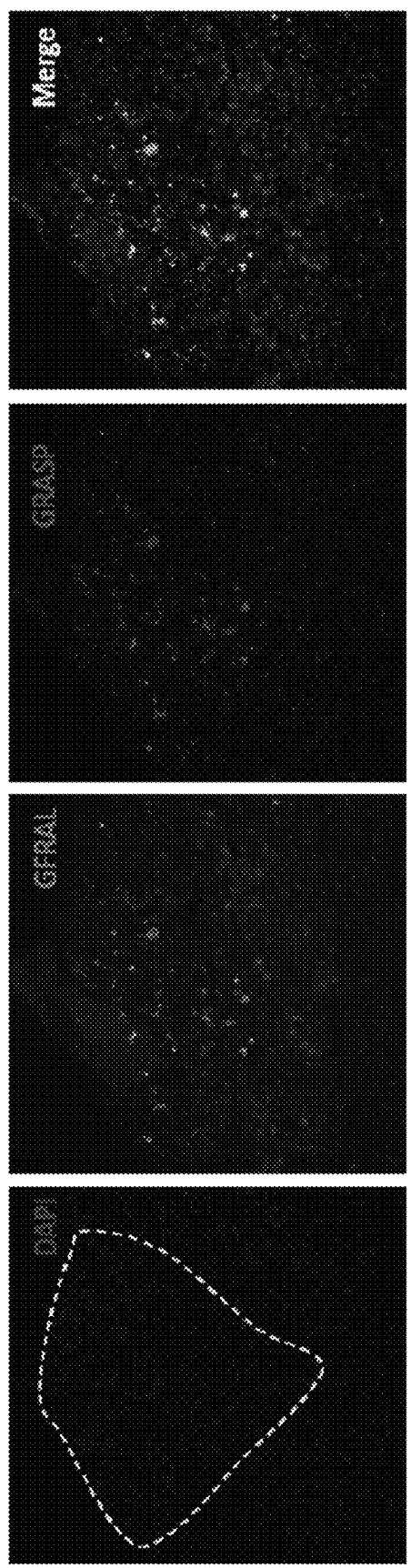
FIG. 9 is an image showing GFANT05 peptide technology co-localizing with the GFRAL receptor in the brainstem (a major source of illness behaviors in disease and/or disease treatments). This technology provides a new route to treat cachexia and chemotherapy induced nausea/vomiting by uniquely blocking the GDF15-GFRAL signaling in the brainstem.

Five potential ligands (GFANT01-GFANT05, SEQ. ID NOs: 1-5, wherein the K* in each peptide is Lysine(N$_3$)) were synthesized. The effects of each of the novel ligands were tested for their ability to alter nausea in rats over the course of 24 hours. Although GFANT01-GFANT05 were tested, only GFANT05 was found to have a significant effect on nausea/illness-like behaviors in rats. Animals were given either MIC-1 (30 pmol), the endogenous ligand of GFRAL that suppresses appetites, GFANT05 (300 pmol), or a combination of both and their food intake was monitored for up to 24 hrs (FIG. 5A). While there was little difference in food consumption between control and treated groups early, at 24 hrs post-administration, animals given GFANT05 alone ate the same amount of food as untreated control animals. Further, the addition of GFANT05 to shrew that also received MIC-1 did not increase overall food consumption over MIC-1 (FIG. 5A). In addition, kaolin intake, a reliable measure of nausea in rats, was reduced in animals receiving GFANT05 compared to vehicle alone and that of a known nausea-inducing compound (MIC-1) (FIG. 5B). Taken together, these data suggest that GFANT05 is an antagonistic compound that promotes food consumption and decreases nausea in animals. Analysis of emetic episodes were measured by an observer blinded to treatment groups.

Example 4—Ejaculation Studies in Rats

Administration of GFANT01 to rats was found to result in spontaneous ejaculation in male rats. MIC-1 was found to have the same effect on male rats. Rats were video recorded for 3 h and the number of spontaneous ejaculations were analyzed by an observer blinded to treatment groups. Without wishing to be bound by theory, GFANT01 may be an agonist of the GFRAL receptor.

OTHER EMBODIMENTS

The recitation of a listing of elements in any definition of a variable herein includes definitions of that variable as any single element or combination (or subcombination) of listed elements. The recitation of an embodiment herein includes that embodiment as any single embodiment or in combination with any other embodiment or portions thereof.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method of treating nausea in a subject in need thereof, the method comprising administering an effective amount of an engineered peptide antagonist of a GDNF family receptor alpha-like (GFRAL) receptor comprising SEQ ID NO: 5 wherein the lysine at position 2 of SEQ ID NO: 5 is lipidated.

2. The method of claim 1, wherein the effective amount is between 1 pmole/kg to 100 mmoles/kg.

3. The method of claim 1, wherein the engineered peptide is administered acutely or chronically over the course of multiple hours or days.

4. The method of claim 1, wherein the effective amount is at least 300 pmol.

5. A method of promoting weight gain in a subject in need thereof, the method comprising administering an effective amount of an engineered peptide antagonist of a GDNF family receptor alpha-like (GFRAL) receptor comprising SEQ ID NO: 5 wherein the lysine at position 2 of SEQ ID NO: 5 is lipidated.

6. The method of claim 5, wherein the effective amount is between 1 pmole/kg to 100 mmoles/kg.

7. The method of claim 5, wherein the engineered peptide is administered acutely or chronically over the course of multiple hours or days.

8. A method of treating male sexual dysfunction in a subject in need thereof, comprising administering an effective amount of an engineered peptide of a GDNF family receptor alpha-like (GFRAL) receptor comprising SEQ ID NO: 1 wherein the lysine at position 8 of SEQ ID NO: 1 is lipidated.

9. The method of claim 8, wherein the effective amount is between 1 pmole/kg to 100 mmoles/kg.

10. The method of claim 8, wherein the engineered peptide is administered acutely or chronically over the course of multiple hours or days.

11. A method of promoting weight loss in a subject in need thereof, the method comprising administering an effective amount of an engineered peptide of a GDNF family receptor alpha-like (GFRAL) receptor comprising SEQ ID NO: 1, wherein the lysine at position 8 of SEQ ID NO: 1 is lipidated.

12. The method of claim 11, wherein the effective amount is between 1 pmole/kg to 100 mmoles/kg.

13. The method of claim 11, wherein the engineered peptide is administered acutely or chronically over the course of multiple hours or days.

* * * * *

SEQUENCE LISTING

```
<160> NUMBER OF SEQ ID NOS: 10

<210> SEQ ID NO 1
<211> LENGTH: 20
<212> TYPE: PRT
<213> ORGANISM: Artificial Sequence
<220> FEATURE:
<223> OTHER INFORMATION: Peptide Sequence

<400> SEQUENCE: 1

Glu Asp Asp Val Ser Phe Gln Lys Leu Asp Asp Asn Val Arg Tyr His
1               5                   10                  15

Thr Leu Arg Lys
            20

<210> SEQ ID NO 2
<211> LENGTH: 20
<212> TYPE: PRT
<213> ORGANISM: Artificial Sequence
<220> FEATURE:
<223> OTHER INFORMATION: Peptide Sequence

<400> SEQUENCE: 2

Asp Asp Asp Leu Ser Phe Gln Lys Leu Asp Asp Asn Val Tyr Tyr His
1               5                   10                  15

Leu Leu Arg Lys
            20

<210> SEQ ID NO 3
<211> LENGTH: 13
<212> TYPE: PRT
<213> ORGANISM: Artificial Sequence
<220> FEATURE:
<223> OTHER INFORMATION: Peptide Sequence

<400> SEQUENCE: 3

Lys Leu Asp Asp Asn Val Tyr Tyr His Leu Leu Arg Lys
1               5                   10

<210> SEQ ID NO 4
<211> LENGTH: 19
<212> TYPE: PRT
<213> ORGANISM: Artificial Sequence
```

```
<220> FEATURE:
<223> OTHER INFORMATION: Peptide Sequence

<400> SEQUENCE: 4

Lys Pro Met Val Leu Ile Gln Lys Thr Asp Thr Gly Val Ser Leu Gln
1               5                   10                  15

Thr Tyr Asp

<210> SEQ ID NO 5
<211> LENGTH: 29
<212> TYPE: PRT
<213> ORGANISM: Artificial Sequence
<220> FEATURE:
<223> OTHER INFORMATION: Peptide Sequence

<400> SEQUENCE: 5

Thr Lys Glu Glu Leu Ile His Ala His Ala Asp Pro Met Val Leu Ile
1               5                   10                  15

Gln Lys Thr Asp Thr Gly Val Ser Leu Gln Thr Tyr Asp
            20                  25

<210> SEQ ID NO 6
<211> LENGTH: 31
<212> TYPE: PRT
<213> ORGANISM: Artificial Sequence
<220> FEATURE:
<223> OTHER INFORMATION: Peptide Sequence

<400> SEQUENCE: 6

Val Leu Ser Pro Arg Glu Val Gln His Ala His Ala Asp Pro Met Val
1               5                   10                  15

Leu Ile Gln Lys Thr Asp Thr Gly Val Ser Leu Gln Thr Tyr Asp
            20                  25                  30

<210> SEQ ID NO 7
<211> LENGTH: 18
<212> TYPE: PRT
<213> ORGANISM: Artificial Sequence
<220> FEATURE:
<223> OTHER INFORMATION: Peptide Sequence

<400> SEQUENCE: 7

Val Leu Ser Pro Arg Glu Val Gln His Ala His Ala Asp Pro Met Val
1               5                   10                  15

Leu Ile

<210> SEQ ID NO 8
<211> LENGTH: 31
<212> TYPE: PRT
<213> ORGANISM: Artificial Sequence
<220> FEATURE:
<223> OTHER INFORMATION: Peptide Sequence

<400> SEQUENCE: 8

Val Ile Thr Pro Arg Glu Val Gln His Ala His Ala Asp Pro Met Ile
1               5                   10                  15

Leu Ile Gln Lys Thr Asp Ser Gly Ile Ser Ile Gln Ser Tyr Glu
            20                  25                  30

<210> SEQ ID NO 9
<211> LENGTH: 18
<212> TYPE: PRT
<213> ORGANISM: Artificial Sequence
<220> FEATURE:
```

```
<223> OTHER INFORMATION: Peptide Sequence

<400> SEQUENCE: 9

Val Ile Thr Pro Arg Glu Val Gln His Ala His Ala Asp Pro Met Ile
1               5                   10                  15

Leu Ile

<210> SEQ ID NO 10
<211> LENGTH: 29
<212> TYPE: PRT
<213> ORGANISM: Artificial Sequence
<220> FEATURE:
<223> OTHER INFORMATION: Peptide Sequence

<400> SEQUENCE: 10

Thr Lys Glu Glu Leu Ile His Ala His Ala Asp Pro Met Ile Leu Ile
1               5                   10                  15

Gln Lys Thr Asp Ser Gly Ile Ser Ile Gln Ser Tyr Glu
            20                  25
```